United States Patent
Kagami et al.

(10) Patent No.: US 6,678,109 B2
(45) Date of Patent: Jan. 13, 2004

(54) DISK DRIVE, SERVO CONTROL UNIT, AND CONTROL UNIT

(75) Inventors: Naoyuki Kagami, Fujisawa (JP); Masayuki Murakami, Fujisawa (JP); Yuzo Nakagawa, Hiratsuka (JP); Tatsuya Sakai, Yamato (JP)

(73) Assignee: Hitachi Global Technologies, Amsterdam (NL)

(*) Notice: Subject to any disclaimer, the term of this patent is extended or adjusted under 35 U.S.C. 154(b) by 0 days.

(21) Appl. No.: 09/133,464

(22) Filed: Aug. 13, 1998

(65) Prior Publication Data

US 2002/0135930 A1 Sep. 26, 2002

(30) Foreign Application Priority Data

Aug. 13, 1997 (JP) .............................. 9-218641

(51) Int. Cl.[7] .............................................. G11B 5/596
(52) U.S. Cl. .................... 360/77.08; 360/78.14
(58) Field of Search ............................ 360/77.08, 78.14

(56) References Cited

U.S. PATENT DOCUMENTS

| | | | | |
|---|---|---|---|---|
| 5,191,568 A | * | 3/1993 | Muto et al. ................. 369/32 |
| 5,262,907 A | * | 11/1993 | Duffy et al. ............. 360/77.05 |
| 5,576,910 A | * | 11/1996 | Romano et al. ......... 360/77.08 |
| 5,602,693 A | * | 2/1997 | Brunnett et al. ......... 360/77.08 |
| 5,659,437 A | * | 8/1997 | Tsunekawa et al. ...... 360/77.08 |
| 5,918,068 A | * | 6/1999 | Shafe .......................... 710/11 |
| 6,118,604 A | * | 9/2000 | Duffy .......................... 360/48 |

FOREIGN PATENT DOCUMENTS

| | | |
|---|---|---|
| EP | 0543654 A2 | 5/1993 |
| EP | 0575624 A | 12/1993 |
| JP | 06-214934 | 8/1994 |
| JP | 07-005998 | 1/1995 |
| JP | 07-249275 | 9/1995 |
| JP | 08-180621 | 7/1996 |
| JP | 08-203226 | 8/1996 |
| JP | 08-321142 | 12/1996 |
| JP | 09055051 A | 2/1997 |

* cited by examiner

*Primary Examiner*—David Hudspeth
*Assistant Examiner*—Dan I. Davidson
(74) *Attorney, Agent, or Firm*—Crawford Maunu PLLC

(57) ABSTRACT

A disk drive, a servo controller, and a controller which have realized high-degree control by lightening processing load to a microprocessor unit (MPU) without increasing cost is disclosed. An analog/digital (AD) converter (ADC) performs the AD conversions of the regenerated levels A, B, C, and D of burst patterns supplied from a channel and retains the converted levels in an ADC register. A servo assist (SA) computes parameters, such as the position error of a head, independently of an MPU, based on the regenerated levels of the burst patterns retained in the ADC register and an instruction from the MPU retained in a SRAM. Based on the computed parameters, the SA computes servo data (DACOUT) for driving a voice coil motor and supplies the servo data to the DAC section of a VCM driver section through a SIO.

9 Claims, 19 Drawing Sheets

| MPES | SPES | MPES+SPES | MPES : SPES | CUR_POS equation | CUR_CYL equation | |
|---|---|---|---|---|---|---|
| | | | | | ODD CYLID | EVEN CYLID |
| >80 | ≥80 | >100 | > | SPES-80 | CYLID+1 | CYLID+0 |
| >80 | >80 | >100 | ≤ | -MPES | CYLID+1 | CYLID+0 |
| ≤80 | >80 | >100 | < | -MPES | CYLID-1 | CYLID+0 |
| <80 | >80 | ≤100 | < | -SPES+80 | CYLID-1 | CYLID+0 |
| <80 | ≤80 | <100 | ≥ | -SPES-80 | CYLID+0 | CYLID+1 |
| <80 | <80 | <100 | > | MPES | CYLID+0 | CYLID+1 |
| ≥80 | <80 | <100 | > | MPES | CYLID+0 | CYLID-1 |
| >80 | <80 | ≥100 | > | SPES+80 | CYLID+0 | CYLID-1 |

Fig. 5

| Tr<br>O/E | n-1<br>ODD | n<br>EVEN | n+1<br>ODD | n+1<br>EVEN | |
|---|---|---|---|---|---|
| (a) | | ▶ | | ▶ | CUR POS=SPES-80 |
| (b) | | ▶ | | | CUR POS= MPES |
| (c) | | ▶ | | | CUR POS=-MPES |
| (d) | | ▶ | | | CUR POS= -SPES+80 |
| (e) | | | ▶ | | CUR POS -SPES-80 |
| (f) | | | ▶ | | CUR POS=MPES |
| (g) | | | ▶ | | CUR POS=MPES |
| (h) | ▶ | | | ▶ | CUR POS-SPES+80 |
Fig. 8
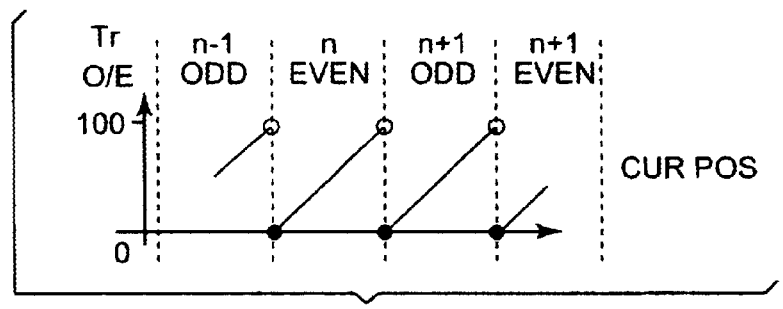
Fig. 9
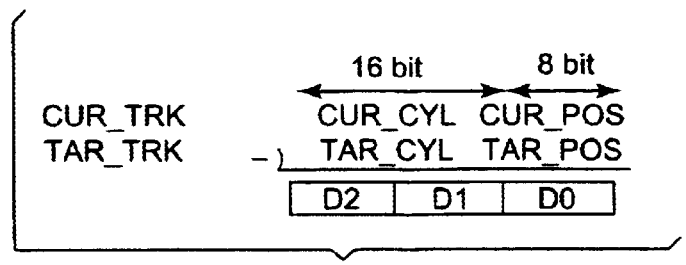
Fig. 10

|     |    |          | W2        |
|-----|----|----------|-----------|
| (a) | W0 | 00000000 | 00000101 |
|     | W1 | +00001011 |          |
|     |    | 00001011 |          |
|     |    |          | 10000010 |
| (b) | W0 | 00000101 |          |
|     |    | +00000000 |         |
|     |    | 00000101 |          |
|     |    |          | 11000001 |
| (c) | W0 | 00000010 |          |
|     | W1 | +00001011 |         |
|     |    | 00001101 |          |
|     |    |          | 11100000 |
| (d) | W0 | 00000110 |          |
|     |    | +00000000 |         |
|     |    | 00000110 |          |
|     |    |          | 01110000 |
| (e) | W0 | 00000011 |          |
|     |    |          |          |
| (f) | W0 | 00000000 | 00110111 |

# DISK DRIVE, SERVO CONTROL UNIT, AND CONTROL UNIT

BACKGROUND OF THE INVENTION

1. Field of the Invention

The present invention relates to a disk drive, a servo control unit, and a control unit, and more particularly to a disk drive, a servo controller, and a controller which have realized high-degree control by lightening processing load to a microprocessor unit (MPU) without increasing cost.

2. Description of Related Art

In hard-disk drives (HDDs) employing magnetic disks as data storage media, concentric circular recording tracks are formed on the magnetic disk. In a conventional HDD, as shown for example in FIG. 2, circular tracks 202 with a predetermined width are formed concentrically on the recording surface of a magnetic disk 201. The recording surface is provided at predetermined-angle intervals with servo areas on which servo patterns 203 are recorded. In addition, between adjacent servo areas there is provided a data sector 205 on which a data area 204 is recorded.

In the aforementioned conventional HDD, if a sector is specified from an outside unit and recording/regeneration is instructed, the head 206 will be moved to a target track on which the sector specified for recording/regeneration has been recorded (seek control). After the head 206 has arrived at the target track, the head position is adjusted so that the head 206 follows the target track (following control). The servo control, such as seek control and following control, is performed by driving a head arm 207 with the head 206 attached thereto by means of a voice coil motor (VCM) 208.

A description will hereinafter be made of the following control.

Each servo sector 303, as shown in FIG. 3, records a cylinder ID number (CYLID) indicating a track number, a physical sector number (SECCNT) indicating a servo pattern number, burst patterns (WEDGE-A, WEDGE-B, WEDGE-C, WEDGE-D) for tracking (following) control, and so on.

The cylinder ID number CYLID is recorded with special notation called a gray number code. Unlike normal binary-coded notation, the gray number code is defined so that each time a value increases by 1, only a single point in a bit pattern changes. In the gray number code, even when the head 306 flies between the cylinder ID numbers CYLIDn and CYLIDn−1, either value is always obtained.

The physical sector number SECCNT is a number for identifying each individual servo pattern. Even when the radial position varies, this number does not change, so it is recorded with binary-coded notation.

The burst patterns (WEDGE-A, WEDGE-B, WEDGE-C, WEDGE-D) are magnetic patterns for removing the uncertainty of the cylinder ID number CYLID such as described above, deciding over which track the head is positioned among adjacent tracks, and also detecting a detail position on a track. The burst patterns, as shown in FIG. 3, are recorded so that the radial recorded positions of the burst patterns each having the width of two track pitches as one cycle differ from each other by half the track pitch.

If the head 306 passes over tracks constructed as described above, the regenerated outputs CYLID, SECCNT, WEDGE-A, WEDGE-B, WEDGE-C, and WEDGE-D will appear in this order on the output of the magnetic head 306. The regenerated levels A, B, C, and D of these burst patterns WEDGE-A, WEDGE-B, WEDGE-C, and WEDGE-D change in correspondence with the position of the head 306.

FIG. 4 shows a change in the regenerated level of each burst pattern in the case where the center position of the head 306 (as shown in FIG. 3) changes from one end of a track n−1 to one end of a track n+2. Each of the regenerated levels A, B, C, and D changes linearly in correspondence with the position of the head 306 when the head 306 is in a predetermined range. Also, A+B and C+D are nearly constant, respectively. For this reason, from the regenerated output levels of the burst patterns a position error signal (PES) can be detected. On this PES, there are two kinds: a master PES (MPES) employing the aforementioned A and B and a slave PES (SPES) employing C and D. The MPES and the SPES are computed by the following equations:

$$MPES = \frac{A-B}{A+B} \times H + 80h = \frac{2A}{A+B} \times H + 80h - H \quad (1)$$

$$SPES = \frac{C-D}{C+D} \times H + 80h = \frac{2C}{C+D} \times H + 80h - H \quad (2)$$

where $00h \leq A$, B, C, and $D \leq FFh$ and H is the head coefficient ($00h \leq H \leq 7Fh$, 7F and vicinity). The value areas of the master position error signal MPES and the slave position error signal SPES are both greater than 01h and less than FFh.

In the case where the magnetic head 306 passes over the center of a track n, A and B become equal to each other, so 2A/(A+B) becomes 1 and MPES becomes 80h. Also, in the case where the magnetic head 306 is offset from the center of the track n in the downward direction in FIG. 3, does not pass over WEDGE-A, and passes over only WEDGE-B, A becomes 0, so 2A/(A+B) becomes 0 and MPES becomes 0h. Conversely, in the case where the magnetic head 306 is offset from the center of the track n in the upward direction in FIG. 3, passes over only WEDGE-A, and does not pass over WEDGE-B, B becomes 0, so 2A/(A+B) becomes 2 and MPES becomes FFh (or CYLID become 00h on a track n+1).

Referring again to FIG. 2, the aforementioned calculation is performed by an MPU equipped in a hard disk controller (HDC)×9, or a digital signal processor (DSP) or an MPU (hereafter referred to as simply an MPU and the like) provided separately from the HDC 209. Also, the MPU and the like compute an operational parameter based on the computed MPES and SPES, compute control data (DACOUT) for driving the VCM 208, based on the operational parameter, and supply the control data to the VCM 208. The VCM 208 changes the position of the head 206, based on the supplied control data. In this way, the head 206 follows the track 202. By controlling the timing of recording/regeneration in such a state, recording/regeneration can be performed on a target sector.

Based on the cylinder ID number CYLID regenerated in the aforementioned way, a track number TRK over which the current head is positioned is detected. Also, the PES obtained in the aforementioned way is added to the track number TRK and the added value is supplied to the HDC 209 as position information (POS) indicating the position of the head.

The HDC 209 generates servo data based on the specified target track and the current head position, controls an operation of the VCM×8, and moves the head 206 to the target track. If the head 206 arrives over the target track, the HDC 209 will execute following control such as described above and perform control of recording/regeneration. An enhancement in the track density and a reduction in the seek time can be realized by executing the aforementioned following control and seek control precisely or at high speed.

However, as described above, in the case where servo control, such as seek control and following control, is performed by the MPU provided in the HDC, if operating speed and control precision are attempted to be enhanced, control load to the MPU within the HDC will be increased. For this reason, there are limits to enhancements in the operating speed and the control precision.

Also, in the case where a DSP or an MPU is provided separately from the MPU provided within the HDC for seek control and following control, the device fabrication cost will be raised to more than necessary, because the DSP or the MPU includes functions not needed for servo control.

It can be seen that there is a need for a disk drive which is capable of enhancing operating speed and control precision without increasing cost.

SUMMARY OF THE INVENTION

To overcome the limitations in the prior art described above, and to overcome other limitations that will become apparent upon reading and understanding the present specification, the present invention discloses a disk drive which is capable of enhancing operating speed and control precision without increasing cost.

A method in accordance with the principles of the present invention includes a disk drive including a disk storage medium having a servo area on which servo sectors are recorded and a data area on which data sectors are recorded; a record/regenerate section for performing regeneration of a servo sector recorded on the disk storage medium and also performing recording or regeneration of a data sector; a drive section for controlling a position of the record/regenerate section; a control section for performing at least input-output control of data with respect to external equipment or control of the recording or regeneration of a data sector which is performed by the record/regenerate section; a position information extraction section for extracting position information indicating the position of the record/regenerate section from a regenerated output of the servo sector regenerated by the record/regenerate section; and an arithmetic section provided separately from the control section and for computing servo data for driving the drive section, based on the position information extracted by the position information extraction section.

The arithmetic section includes a plurality of retaining sections for retaining data generated in the interior of the position information extraction section, the control section, or the arithmetic section; an adder; at least two selectors for selecting data which is supplied to the adder from data retained in the plurality of retaining sections, external input, and from data generated in the interior of the arithmetic section; and a hardware sequencer for controlling operations of the retaining sections, the adder, and the selectors. The servo data may be computed by control based on the hardware sequencer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a diagram showing a table used for the computation of the position error signal of the head in the disk drive according to the embodiment of the present invention;;

FIG. 8 is a diagram showing the relationship between the position of the head in the track width direction and an computation equation used to compute a current position;

FIG. 9 is a diagram showing the position of the head in the track width direction and a change in a current position;

FIG. 10 is a diagram showing computation of track distance;

FIG. 20 is a diagram showing data change in the multiplication performed by the SA;

FIG. 21 is a diagram showing binary division performed by manual calculation;

DETAILED DESCRIPTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
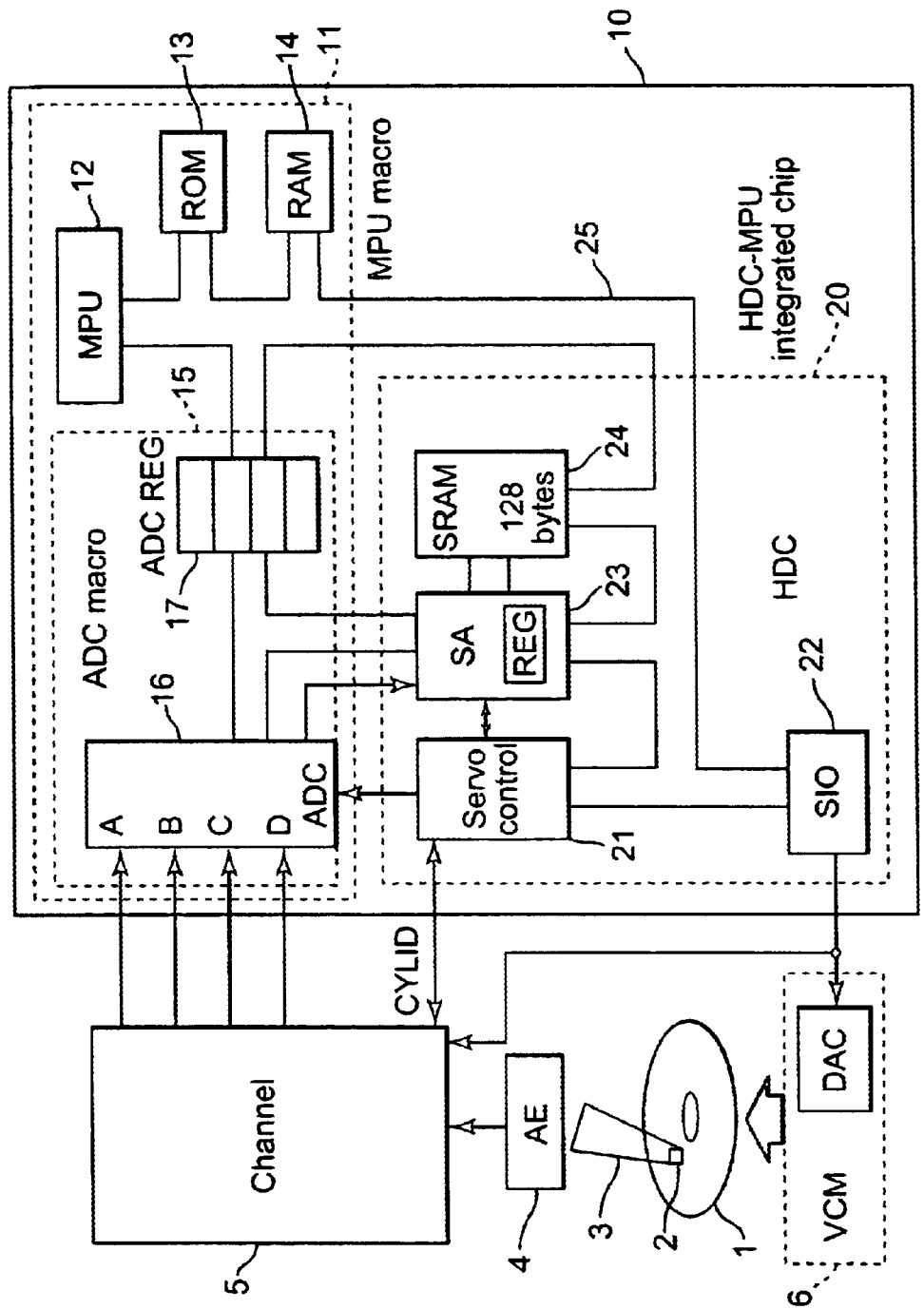
FIG. 1 is a block diagram showing the constitution of a disk drive according to an embodiment of the present invention.

FIG. 1 is a block diagram showing the constitution of a disk drive according to a first embodiment of the present invention. This disk drive is equipped with an HDC-MPU integrated chip 10 and a VCM driver section 6. The HDC-MPU integrated chip 10 is equipped with a magnetic disk 1, a head 2 for performing recording/regeneration on the magnetic disk 1, a head arm 3 with the head 2 attached thereto, a head amplifier (AE) 4 disposed near the head 2 for amplifying a signal regenerated from the head 2, a channel section 5 for performing extraction of a servo pattern and a cylinder ID number (CYLID) from the regenerated output supplied through the AE 4 and for performing conversion of a coding system, an HDC 20 for performing formation of a servo signal, and an MPU macro block (MPU macro) 11 for controlling an operation of the entire disk drive.

Figure 2:
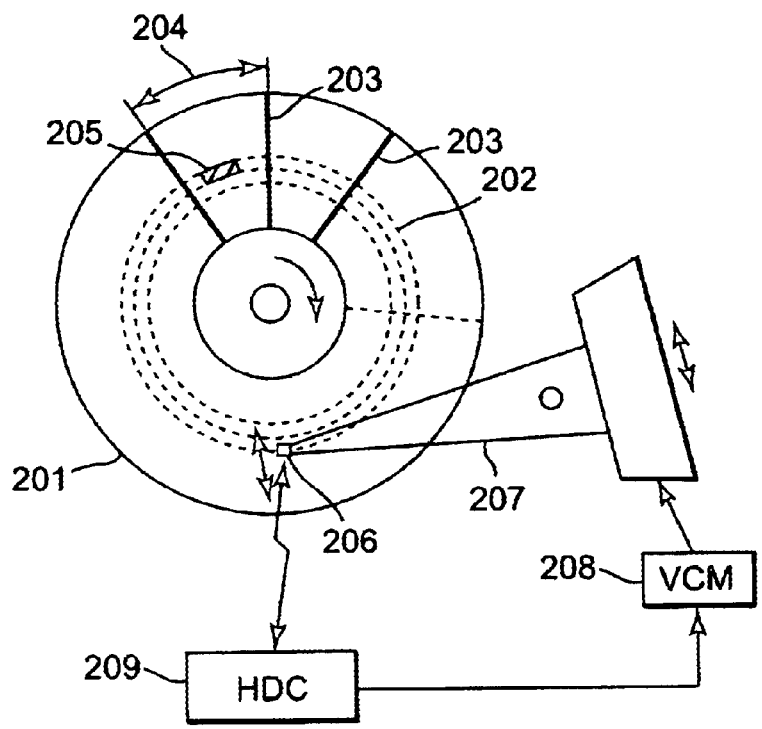
FIG. 2 is a block diagram showing the constitution of a conventional disk drive.

The MPU macro 11 and the HDC 20 are constituted as a single semiconductor device (HDC-MPU integrated chip 10). On the recording surface of the magnetic disk 1, circular tracks 202 with a predetermined width are concentrically formed as in the magnetic disk 201 shown in FIG. 2. Also, the recording surface is provided with servo areas at intervals of a predetermined angle. This servo area records a servo pattern 203. On the data area 204 between adjacent servo patterns 203 on each track 202 a data sector 205 is recorded.

Figure 3:
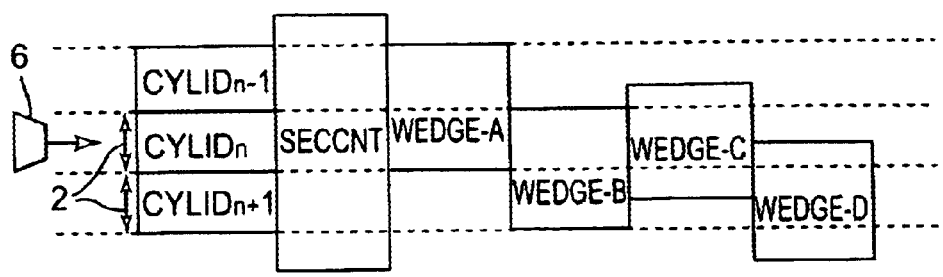
FIG. 3 is a diagram showing an example of the format of a servo sector used in the conventional disk drive.
Figure 4:
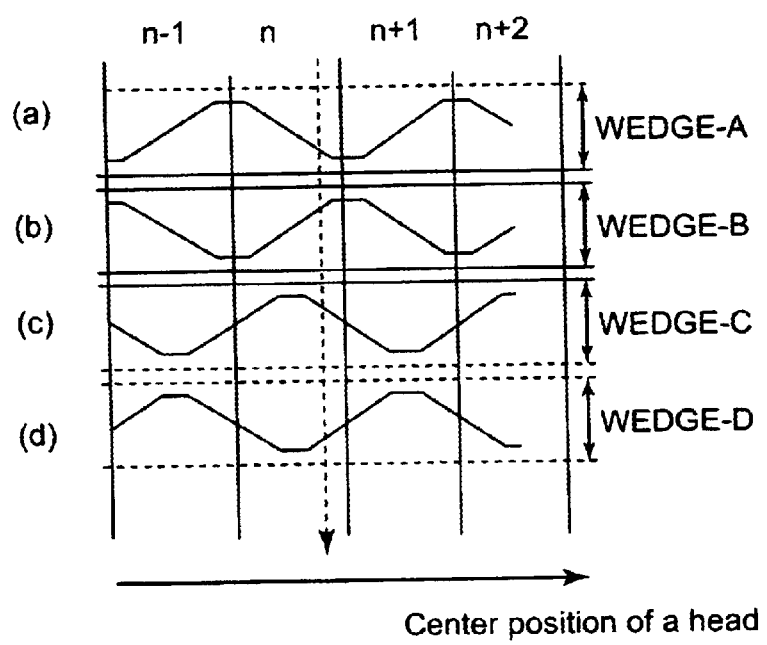
FIG. 4 is a diagram showing the relationship between the radial position of a magnetic head and the level of a regenerated servo pattern.

Each servo sector 203, as with FIG. 3, records a cylinder ID number (CYLID) indicating a track number, a physical sector number (SECCNT) indicating a servo pattern number, burst patterns (WEDGE-A, WEDGE-B, WEDGE-C, WEDGE-D) for tracking (following) control, and so on. The cylinder ID number CYLID and the physical sector number SECCNT are coded and recorded by respective coding systems suitable for recording/regeneration. A channel section 5 regenerates the cylinder ID number CYLID and the physical sector number SECCNT by decoding systems corresponding to the coding systems and supplies them to the MPU macro 11. This channel section 5 also supplies analog voltages A, B, C, and D corresponding to the regenerated levels of the servo patterns (WEDGE-A, WEDGE-B, WEDGE-C, WEDGE-D) to the MPU macro 11.

The MPU macro 11 is equipped with an MPU 12, a read-only memory (ROM) 13 on which programs and data have been recorded, a random access memory (RAM) 14, and an analog/digital (AD) conversion macro block (ADC macro) 15. This ADC macro 15 is equipped with an analog/digital converter (ADC) 16 for performing an AD conversion and an ADC register (ADCREG) 17 for retaining the result of the AD conversion. If the regenerated levels A, B, C, and D of the servo patterns are supplied from the channel 5, the ADC 16 will convert the regenerated levels A, B, C, and D to digital signals in sequence. If the AD conversions end, the ADC 16 will supply the conversion results to the ADC register 17 and also supply an AD conversion completion signal to the HDC 20.

The HDC 20 is equipped with a servo control section 21 for performing generation of a control signal to the channel 5, retrieval of servo patterns, and generation of a cylinder ID number CYLID (gray number code) from a regenerated output, a serial I/O (SIO) 22 for performing a mutual conversion between parallel data and serial data, a hardware sequencer (hereinafter referred to as a servo assist (SA)) 23 for computing servo data, based on the regenerated levels A, B, C, and D of the servo patterns stored in the ADC register 17, and a static RAM (SRAM) 24 for receiving and transmitting data between the SA 23 and the MPU 12.

The SIO 22 mutually converts parallel data which is supplied to the MPU 12 and serial data which is supplied to the channel 5 or converts parallel servo outputs (DACOUT) from the SA 23 or the MPU 12 to serial data which is supplied to a digital/analog conversion (DAC) section provided within the VCM driver section 6. Since the occurrence of the servo output and the occurrence of the input-output of data to the channel 5 are low, the disk drive of this embodiment shares the SIO 22 like this and thereby reduces the cost of the disk drive. Since the SIO 22 is shared like this, the SIO 22 performs conflict control between the processing of data between the MPU 12 and the channel 5 and the processing of data which is supplied from the SA 23 or the MPU 12 to the DAC section of the VCM driver section 6.

The SRAM 24 has, for example, a capacity of 128 bytes (16 bits H 64 words) and is also employed as an area for retaining various coefficients or performing a computation, in addition to data reception and transmission. In this constitution, while the ADC macro 15 incorporated in the MPU 12 has been employed for cost reduction, an AD converter may also be provided separately from the MPU 12 to achieve high-speed operation and high precision.

While the MPU 12 is operated by a program, the SA 23 is operated by a previously set hardware sequence. For this reason, while the SA 23 has particularly been specified for computation of servo control, it can be operated at high speed compared with the MPU 12. In addition, after a predetermined parameter has been set by the MPU 12, the SA 23 can be independently operated, and consequently, processing load to the MPU 12 is not increased so much.

The SA 23 is mounted as a portion of the HDC 20, which is in turn provided on the same chip as the MPU macro 11, as described above. For this reason, while the number of wires remain retained between the SA 23, the MPU 12, and the servo control section 21, the number of terminals for receiving or outputting a signal from or to an external unit can be reduced. Therefore, this arrangement can contribute to a reduction in the package size and a reduction in the device size.

The SA 23 computes a position error signal (PES), based on an interrupt signal supplied from the servo control section 21 (which is generated after the channel 5 has detected a servo pattern), the extracted cylinder ID number CYLID from the channel section 5, four AD conversion completion notifications from the ADC 16, and based on the conversion result data (8 bits or 10 bits) from the ADC register 17. On this position error signal PES, there are two kinds: a master PES (MPES) employing the regenerated levels A and B and a slave PES (SPES) employing the regenerated levels C and D. The MPES and the SPES are obtained by the following equations:

$$MPES = \frac{A-B}{A+B} \times H + 80h = \frac{2A}{A+B} \times H + 80h - H \quad (1)$$

$$SPES = \frac{C-D}{C+D} \times H + 80h = \frac{2C}{C+D} \times H + 80h - H \quad (2)$$

where $00h \leq A$, B, C, and $D \leq FFh$ and H is the head coefficient ($00h \leq H \leq 7Fh$, 7F and vicinity). If burst patterns are normal, A+B and C+D will be nearly constant and these values will be nearly equal to each other. Therefore, by computing the slave position error signal SPES by the following equation, the burst pattern WEDGE-D is rendered unnecessary, thereby being able to widen an area on which data is recorded.

$$SPES = \frac{2C}{C+D} \times H + 80h - H \qquad (3)$$
$$= \frac{2C}{A+B} \times \frac{A+B}{C+D} \times H + 80 - H$$
$$= \frac{2C}{A+B} \times HS + 80 - H$$

where 00h≦HS≦7Fh and HS is the head coefficient (7F and vicinity). Also, when C/(A+B)>1, C/(A+B) is replaced with 1.

The value areas of the master position error signal MPES and the slave position error signal SPES are both greater than 01h and less than FFh, but if the value is small, stability is worse. For this reason, an intermediate value (for example, about 40h to C0h) is selected from the MPES and the SPES and a current in-track position (CUR_POS) is computed. Also, from the values of MPES and SPES the cylinder ID number CYLID of a current track is decided and taken to be a current cylinder (CUR_CYL). The computations of the current in-track position (CUR_POS) and the current cylinder (CUR_CYL) are performed according to a table shown in FIG. 5.

Figure 6:
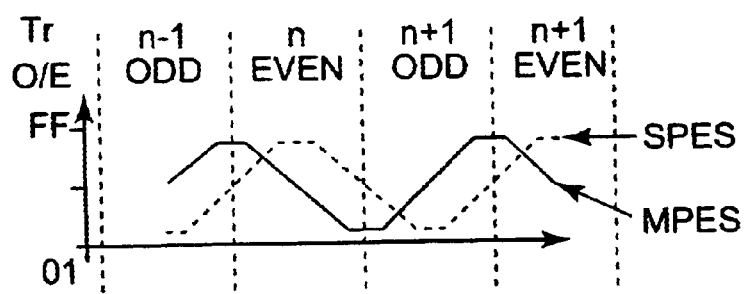
FIG. 6 is a diagram showing the position in the track width direction and a change in the position error signal of the head in the disk drive according to the embodiment of the present invention.
Figure 7:
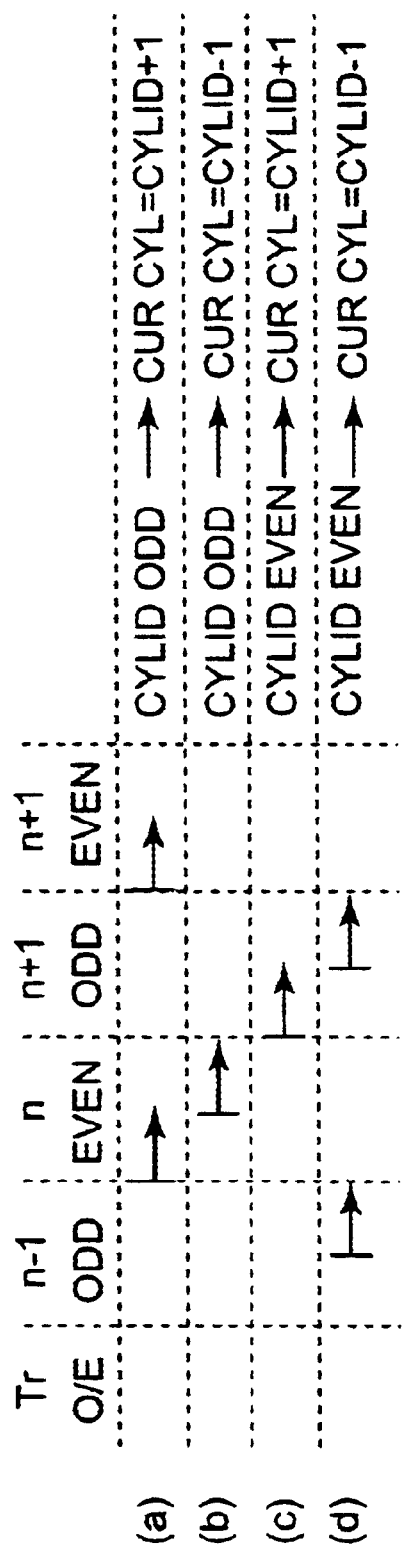
FIG. 7 is a diagram showing the relationship between the position of the head in the track width direction and an computation equation used to compute a cylinder ID number.

The changes of the MPES and SPES with respect to the position of the head 2 in the radial direction of the magnetic disk 1 become as shown in FIG. 6. The current cylinder CUR_CYL which is computed by a table shown in FIG. 5 becomes as shown in FIG. 7. Also, an equation for computing a current in-track position CUR_POS becomes as shown in FIG. 8 with respect to the position of the head 2 in the radial direction of the magnetic disk 1, and the current in-track position CUR_POS which is computed by this equation becomes as shown in FIG. 9. The SA 23 adds the current cylinder CUR_CYL and the current in-track position CUR_POS computed in this way and defines it as a current track CUR_TRK.

Furthermore, the SA 23 defines as a target track (TAR_TRK) a track at which the head 2 is desired to be held, and as hereinafter described, parameters, such as the track distance (DST) between this target track and a current track CUR_TRK, deviation (CPE), the sum of deviations (SPE to be described later) of a plurality of servo patterns (when regenerated), and the deviation difference (speed CVE) between servo patterns, are computed.

The current track CUR_TRK and the target track TAR_TRK, as shown in FIG. 10, comprise 16-bit CUR_CYL and 16-bit TAR_CYL indicating CYLID and 8-bit CUR_POS and 8-bit TAR_POS indicating in-track position, respectively. Therefore, as shown in FIG. 10, the difference between the current track CUR_TRK and the target track TAR_TRK becomes 24 bits (D0, D1, and D2).

The SA 23 takes the absolute value of the high order 16 bits of the difference between a current track and a target track (D2, D1), that is, the difference in track number (CYLID) between a current track and a target track to be track distance DST. The SA 23 also takes the difference between the low order 16 bits of difference (D1, D0), that is, the low order 8 bits of the difference in track number (CYLID) between a current track and a target track and in-track position to be deviation CPE. The value area of the deviation CPE is 8000h to 7FFFh. In addition, the SA 23 takes the absolute value of the deviation CPE to be absolute deviation APE.

The track distance DST, deviation CPE, and absolute deviation APE are computed by the SA 23 each time each servo pattern is regenerated. Also, the SA 23 retains at least deviation CPE, and when a plurality of servo patterns are regenerated, the SA 23 computes the sum of the deviations (deviation sum) SPE and the difference in deviation (speed) CVE between servo patterns. Furthermore, the SA 23 computes the absolute value (absolute speed) AVE of the speed CVE.

Figure 11:
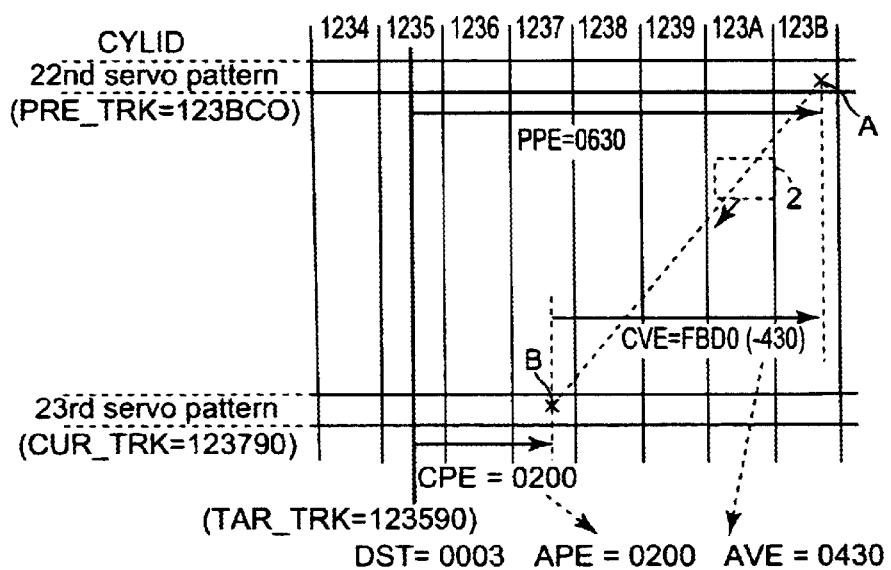
FIG. 11 is a diagram showing computation of head speed.

A description will be made of the case where the head 2 arrives from the position A on the 22nd servo pattern at the position B on the 23rd servo pattern, on the way to track 1235h where the head 2 moves, as shown for example in FIG. 11. When the head 2 is at position B, the track distance DST is 0003h. Also, when the head 2 is at position B, the deviation CPE is 0200. The preceding deviation CPE (PPE), that is, the deviation CPE when the head 2 is at position A is 0630h. Therefore, the absolute deviation APE becomes 0200h. Also, the speed CVE is the difference between these deviations CPE, 0200h−0630h=FDD0h or −430h. Therefore, the absolute speed AVE becomes 0430h.

If the parameters are computed as described above, the SA 23 will perform range judgments of deviation and speed and selection of corresponding processing, deviation prediction and write abort processing, cylinder ID estimation processing, and computation of the sum (SPE) of position deviations when a plurality of servo patterns are regenerated.

Figure 12:
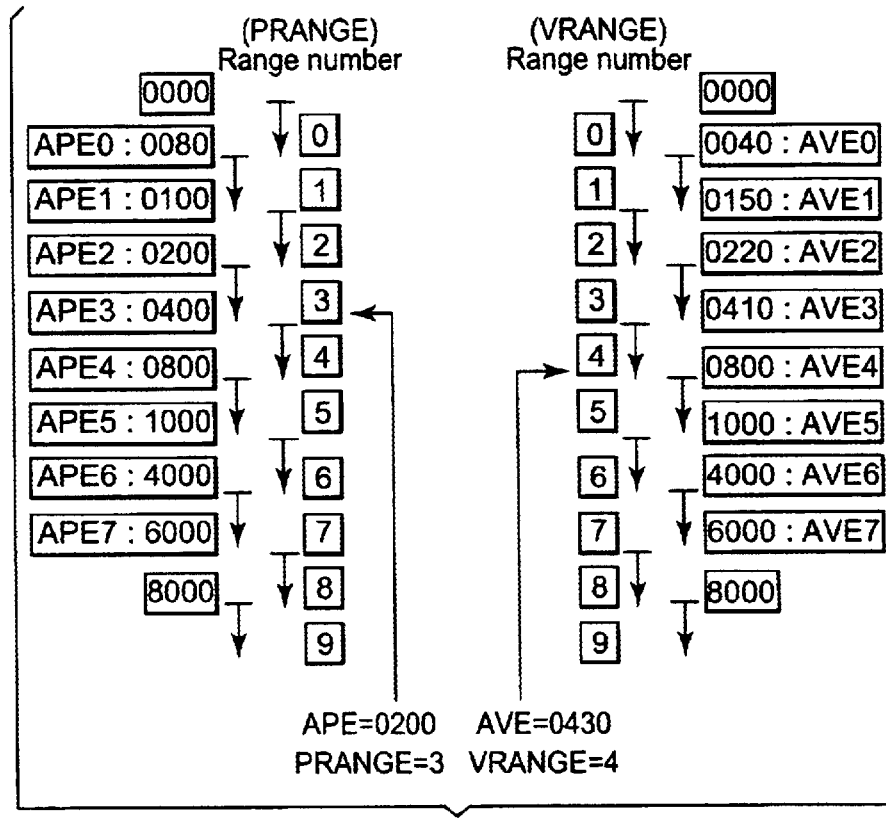
FIG. 12 is a diagram showing a process of computing a range number.

First range judgments of deviation and speed and selection of corresponding processing is performed. There is usually a need to change the characteristics of servo processing in correspondence with the aforementioned deviation (CPE and APE) between a target track and a current track and the aforementioned speed (CVE and AVE) between servo patterns. In the disk drive of this embodiment, as shown in FIG. 12, the value areas of absolute deviation APE and absolute speed AVE are divided into 9 ranges, respectively, and parameters APE0 through APE7 and AVE0 through AVE7 each indicating a boundary between ranges are set. These range parameters are set so as to satisfy APE0<APE1<APE2<APE3<APE4<APE5<APE6<APE7 and AVE0<AVE1<AVE2<AVE3<AVE4<AVE5<AVE6<AVE7.

The SA 23 compares the absolute deviation APE and absolute speed AVE computed in the aforementioned way with the parameters APE0 through APE7 and AVE0 through AVE7, 0000h, and 8000h, and judges in which ranges the absolute deviation APE and absolute speed AVE are located.

The range number (PRANGE) becomes 0 when absolute deviation APE is less than APE0 and becomes 8 when it is greater than APE7. In the aforementioned computation equation, there is the possibility that deviation CPE will not be within 16 bits, and in that case, the range number becomes 9. Also, for absolute speed AVE, the range numbers (VRANGE) are likewise computed.

The SA 23 performs feedback processing on the VCM driver section 6 in correspondence with the computed range numbers (PRANGE and VRANGE). For example, in seek processing, when the head 2 is at a position far away from a target track, the absolute deviation APE is large, and when the head 2 is at a position near to a target track, the absolute deviation APE is small. Therefore, if a feedback value to the VCM driver section 6 is set so as to be large when absolute deviation APE is large and if a feedback value to the VCM driver section 6 is set so as to be small when absolute deviation APE is small, the deceleration of the head 2 near a target track can be realized. Thus, by reducing the speed of the head 2 near a target track, the head 2 is prevented from moving over a line, thereby being able to contribute to a shortage in the seek time, and track following becomes easy.

The SA 23 also executes abort processing, based on the ranges of absolute deviation and absolute speed. For absolute deviation APE and absolute speed AVE, respective range references (for example, APE3 and AVE4) are set. For the range references, different references are also set to writing/reading. The SA 23 aborts write/read processing if either one or the other of the aforementioned computed absolute deviation and absolute speed ranges exceeds the reference. By performing abort processing such as this, writing/reading with respect to a wrong track can be prevented.

Next, deviation prediction and write abort processing are performed. In the aforementioned abort processing, the abortion of writing/reading has been performed based on current deviation and speed, but during writing, the position of the head 2 when the next servo pattern is regenerated is predicted and then write abortion is performed. More specifically, the SA 23 predicts the position deviation at the next servo pattern from the absolute value of CPE+CVE and then performs write abortion in the case where the absolute value of the predicted value is not within a certain reference value (PWAC) or it is greater than 7FFFh.

Figure 13:
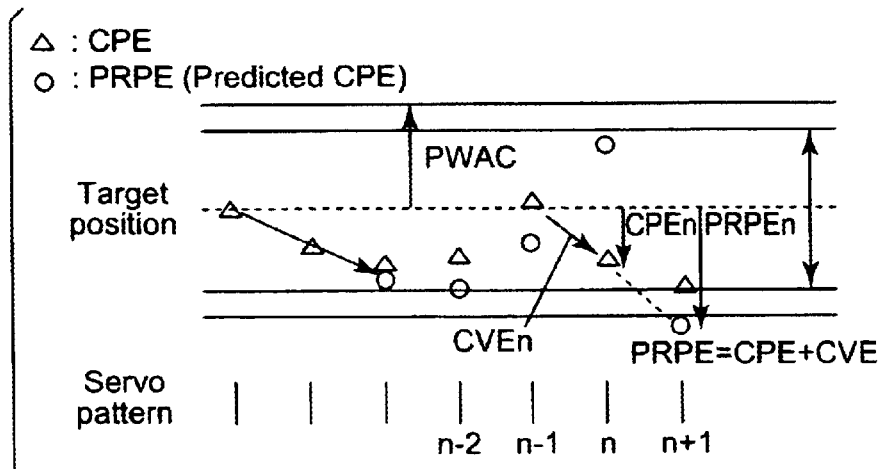
FIG. 13 is a diagram showing a process of predicting deviation.

In such a case, that is, in the case where |CPE+CVE|>PWAC or |CPE+CVE|>7FFFh, when a servo pattern n in FIG. 13, for example, is regenerated, it is predicted that the deviation at the next servo pattern will be large and it is judged that it is improper to continue a write operation, so writing is aborted. On the reference value PWAC, an appropriate value is set with the anticipation that as a result of computation at a current servo pattern, the feedback control to the VCM driver section 6 is performed and also the position of the head 2 is corrected.

Then, cylinder ID estimation processing is performed. As previously described, a cylinder ID number (CYLID) is obtained if the gray number code in a servo pattern is regenerated, but when the head 2 is moving at high speed, there are cases where even a gray number code contains a read error. In such a case, if the gray number code is simply processed as an error, the control of the head position will no longer be able to be performed until the next servo pattern is regenerated.

Figure 14:
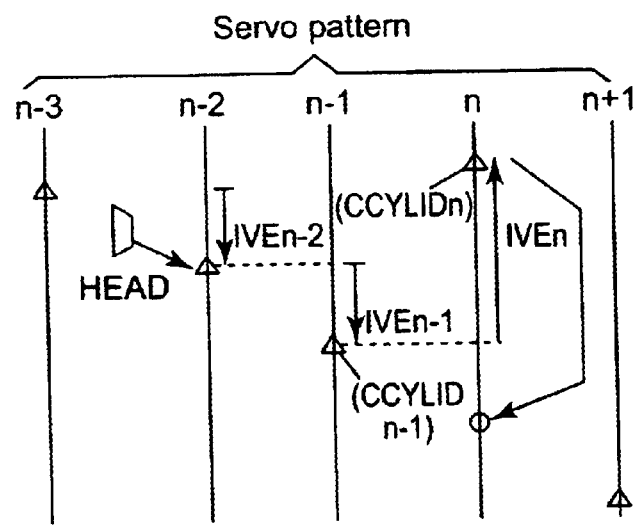
FIG. 14 is a diagram showing a process of estimating a cylinder ID number.

For the aforementioned reasons, the SA 23 will perform estimation of a cylinder ID number in the aforementioned case. For example, as shown in FIG. 14, when the cylinder ID number (CCYLIDn) of a certain servo pattern is obtained, the SA 23 computes the difference IVEn (intercylinder speed) between the obtained cylinder ID number and the cylinder ID number (CCYLIDn−1) one before this. If the intercylinder speed IVEn is greater than a previously prescribed reference speed (AVC which is prescribed based on the speed of the head 2 at which the probability of gray code read error occurrence becomes high), the SA 23 will judge that a gray code read error has occurred, will set the CCYLIDn of the servo pattern n to CCYLIDn−1+IVEn−1, and will continue the servo control thereafter. The aforementioned operation makes it possible to continue servo control even if temporarily a cylinder ID read error occurred and can contribute to the high-speed operation of seek control.

Finally, computation of the sum (SPE) of position deviations when a plurality of servo patterns are regenerated. In order to determine servo data for driving the VCM driver section 6, the previous sum (SPE) of the position deviations between servo patterns is employed. The SA 23 sets an initial value to this SPE at a certain point of time (for example, when a specified servo pattern is regenerated) and adds deviation CPE to it for each servo pattern thereafter. Note that when the addition is performed, the SA 23 judges whether or not deviation CPE is within a SPE addition reference, based on the aforementioned range numbers, and performs the addition only when the deviation is within the reference. Such judgment can remove the influence of a deviation when it has become large temporarily.

After the aforementioned processing has been executed, the SA 23 computes servo data (CNTIN) for controlling the VCM driver section 6. This servo data CNTIN is computed, for example, according to the following equation as the sum of deviation CPE, speed CVE, deviation sum SPE, and calculated values being obtained at the time of the regeneration of the preceding servo pattern, multiplied by appropriate coefficients.

$$CNTIN = U + CENT \qquad (4)$$

$$U = K0 \times CPE + K1 \times CVE + K2 \times SPE + K3 \times U1 + K4 \times U2$$

$$U2 = U1$$

$$U1 = -U$$

where K0, K1, K2, K3, K4, and CENT are correction coefficients.

The SA 23 performs filter processing, oversampling processing, value gain adjustment, and limit processing on the servo data CNTIN computed in the aforementioned way, and supplies the processed servo data to the SIO 22 as control data DACOUT which is fed back to the VCM driver section 6. The SIO 22 supplies the control data DACOUT from the SA 23 to the DAC section of the VCM driver section 6, as serial data. Based on the supplied data (DACOUT), the DAC section of the VCM driver section 6 drives a VCM, thereby controlling the position of the head 2.

Figure 15:
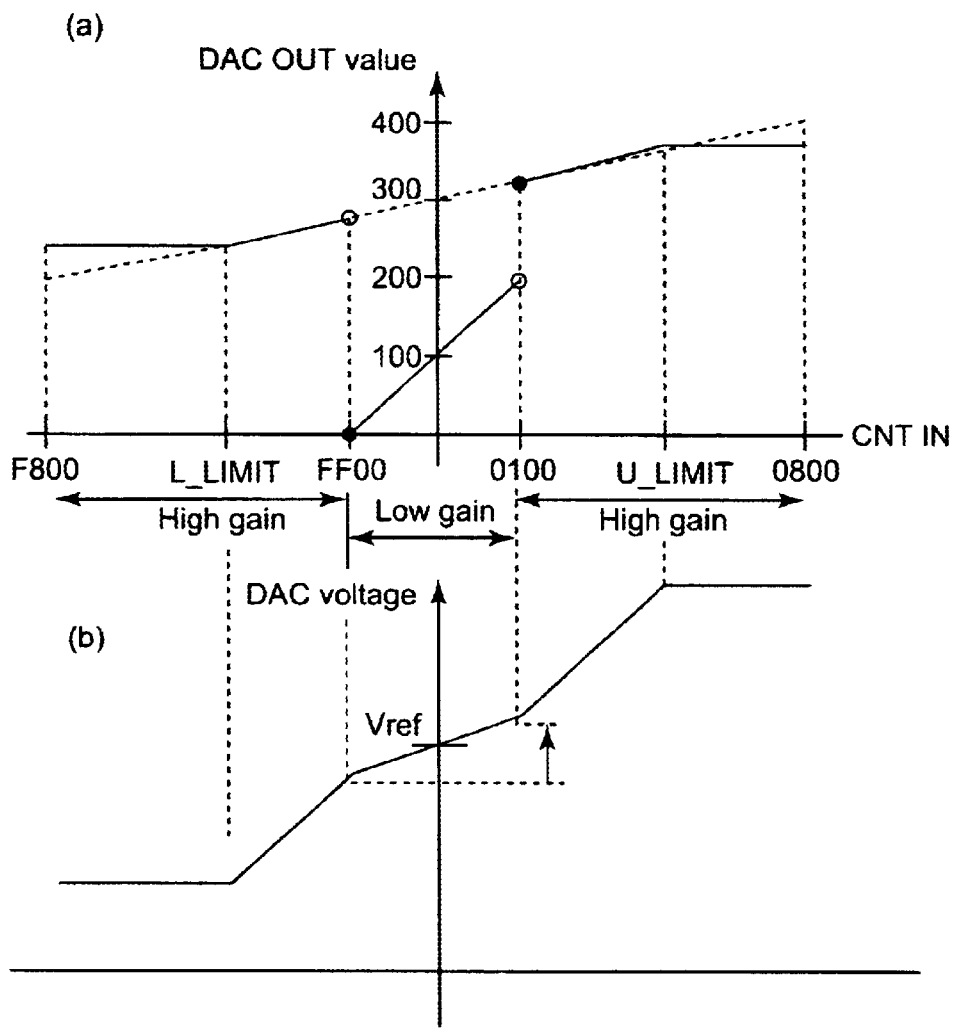
FIG. 15 is a diagram showing the gain adjustment of a DAC drive voltage and the limits on the voltage.

The value gain adjustment and the limit processing is then executed as described herein. The operation of the VCM, incidentally, is determined by voltage which is applied, that is, an analog value. This voltage is generated based on a VCM feedback value (digital control data DACOUT) supplied to the DAC section of the VCM driver section 6. The gain (high/low gain) of the DAC section can be adjusted during operation so that the output voltage can be finely adjusted in a range where voltage is small. For this reason, the SA 23 switches the gain of the DAC section of the VCM driver section 6 so that DAC section has a high gain in a range where servo data CNTIN is between F800h and FF00h and between 0100h and 0800h and also has a low gain in a range where servo data CNTIN is between FF00h and 0100h, as shown for example in FIG. 15(*a*). As the switching is performed, the equation for computing the value of DACOUT is changed so that the output voltage of the DAC section does not become discontinuous. With this change, the output voltage of the DAC section becomes continuous as shown in FIG. 15(*b*), although the DACOUT value becomes discontinuous when servo data CNTIN is between FF00h and 0100h, as shown in FIG. 15(*a*).

Also, there are cases where an output voltage limit is necessary as the characteristic of the VCM. The SA 23 limits the value of control data DACOUT when servo data CNTIN is less than a lower limit value (which is determined in correspondence with the lower limit value of the output voltage of the DAC section of the VCM driver section 6) or greater than an upper limit value (which is determined in correspondence with the upper limit value of the output voltage of the DAC section). With this limit, the output voltage of the DAC section of the VCM driver section 6 is maintained within a predetermined range as shown in FIG. 15(b).

Figure 16:
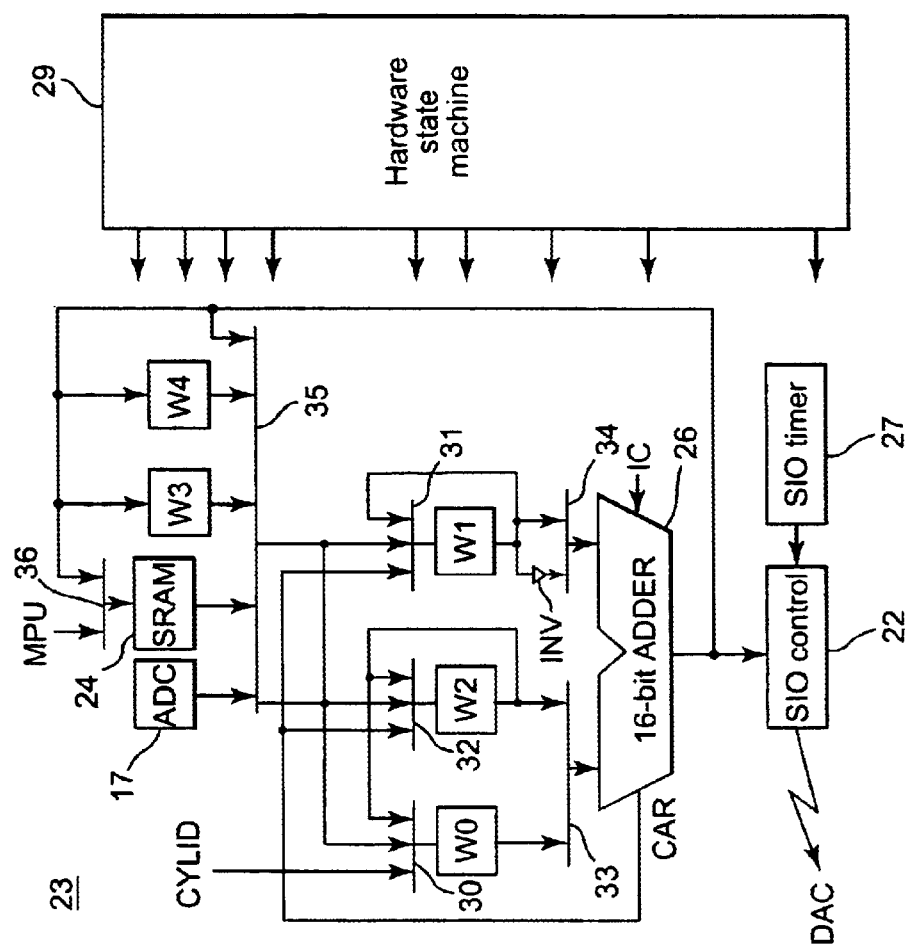
FIG. 16 is a block diagram showing the constitution of a hardware sequencer (SA) constituting the disk drive according to the embodiment of the present invention.

More specifically, the SA 23 is constituted as shown in FIG. 16 and is equipped with registers W0 through W4 for retaining data temporarily, selectors 30 through 36 for performing data selection and also performing simple data processing such as data inversion and shift, a 16-bit adder (hereinafter referred to as simply an adder) 26 for performing addition of two 16-bit data, a SIO timer 27 for controlling the timing at which the SIO 22 is output, and a hardware state machine 29 for performing the entire control of the SA 23.

The control of the setting of data to the registers W0 through W4 and the control of the switching by the selectors 30 through 35 are performed according to a predetermined procedure by the hardware state machine 29. The adder is a general binary adder with an initial carry input (IC) and a carry output (CAR) and performs single addition, for example, W0=W0+W1 for 50 ns.

The outputs of the ADC register 17 and the SRAM 24 shown in FIG. 1 and the outputs of the registers W3 and W4 and the adder 26 shown in FIG. 16 are supplied to the selector 35. The output of the selector 35 is supplied to the selectors 30, 31, and 32. The output of the adder 26 is also supplied to the selector 36 and the registers W3 and W4. The selector 36 selects either the data from the MPU 12 in FIG. 1 or the output of the adder 26 and supplies the selected one to the SRAM 24, by control from the state machine 29.

The output of the selector 35, the cylinder ID number (CYLID) from the channel 5 in FIG. 1, and the output of the register W2 are supplied to the selector 30. The output of the selector 30 is supplied to the register W0. The output of the selector 35, the carry output (CAR) of the adder 26, and the output of the register W1 are supplied to the selector 31. The output of the selector 31 is supplied to the register W1. The output of the selector 35, the carry output (CAR) of the adder 26, and the output of the register W2 are supplied to the selector 32. The output of the selector 32 is supplied to the register W2.

The outputs of the registers W0 and W2 are supplied to the selector 33. The selector 33 selects either one output or the other of the registers W0 and W2 in correspondence with control from the state machine 29 and supplies the selected output to one of the inputs of the adder 26. Also, the output of the register W1 is supplied to the selector 31, inverter INV, and to the selector 34. The output of the inverter INV is also supplied to the selector 34. The selector 34 selects either the output of the register W1 or the inverted output of the register W1 inverted by the inverter INV in correspondence with control from the state machine 29 and supplies the selected output to the other input of the adder 26.

Figure 17:
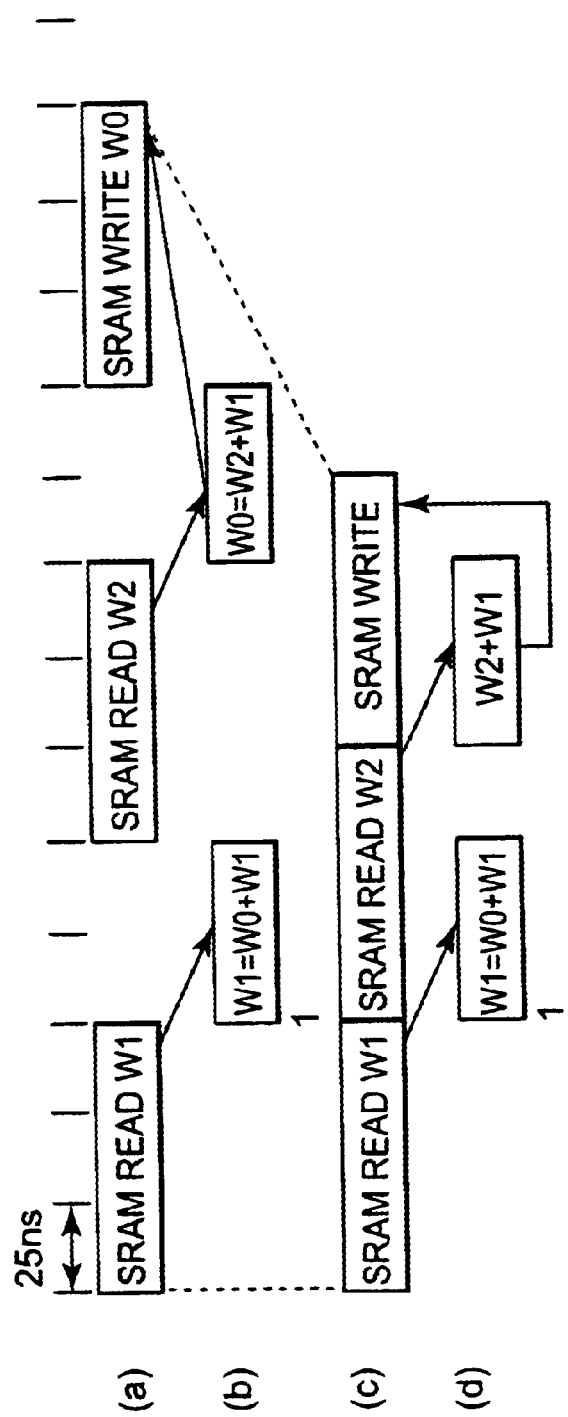
FIG. 17 is a diagram showing computation processing performed by the SA.

The output of the adder 26 is supplied to the SIO 22 shown in FIG. 1. The output of the SIO 22 is supplied in serial form to the DAC section of the VCM driver section 6 at the timing instructed by the SIO timer 27. The SA 23, as shown in FIG. 16, is simply constituted by the adder 26, the registers W0 through W4, and the selectors 30 through 35, but the SA 23 is constructed so as to be able to perform all of the aforementioned servo processing, by controlling computations with the state machine 29. The operation of the SA 23 will hereinafter be described. First, read/write operations/additions are performed in SRAM. In the case where the content of the SRAM 24 is set to the register W1, the state machine 29 supplies both an address on the SRAM 24 at which the data to be set to the register W1 has been recorded and a read request to the SRAM 24. At the same time, the state machine 29 instructs the selector 35 to select the SRAM 24 and the selector 31 to select the selector 35. In the selected state, if the setting of data to the register W1 is instructed, data read from the SRAM 24 will be supplied and set to the register W1, as shown in FIG. 17(a).

In the case where addition, for example, the computation of W1=W0+W1 is performed, the state machine 29 first controls the selectors 30 and 34 to set the values of W0 and W1 and then instructs the adder 26 to perform the computation. With this instruction, the value of W0+W1 is output from the adder 26. Finally, the selectors 35 and 30 are controlled so that the output of the adder 26 is supplied to the register W1. If storage of the data supplied to the register W1 is instructed, the computation result of W0+W1 will be stored in W1 (FIG. 17(b)).

In the case where the content of the register W0 is written to the SRAM 24, the state machine 29 instructs the selector 33 to select the register W0 and makes the output of the selector 34 and the initial carry input (IC) of the adder 26 equal to zero. Therefore, the value of the register W0 appears on the output f the adder 26. At the same time, the state machine 29 supplies both an address on the SRAM 24 at which the data in the register W0 is stored and a write request to the SRAM 24. Therefore, as shown in FIG. 17(a), the data retained on the registe W0 is stored at the selected address on the SRAM 24.

Note that since there is the possibility that the SRAM 24 will have access from the MPU 12, the SRAM 24 is provided with a conflict control mechanism which can cope with the access at the same time. For this reason, as shown in FIG. 17(a), single access to the SRAM 24 requires about 75 ns, including conflict control.

However, the adder 26 is empty while data is being read from the SRAM 24. For this reason, if the state machine 29 is constructed so that after the reading of data from the SRAM 24 shown in FIG. 17(a) has been ended, the state machine 29 instructs the adder 26 to perform a computation, as shown in FIG. 17(b), and so that the state machine 29 performs reading control of data from the SRAM 24 to the register at the same time, then access to the SRAM 24 and computation by the adder 26 can be performed at the same time.

By performing similar control during a write operation, access to the SRAM 24 and computation by the adder 26 can be performed in parallel. Furthermore, as shown in FIGS. 17(c) and (d), if the state machine 29 is constructed so that the selection of an address on the SRAM 24, to which the result of computation is written, and the computation of W2+W1 are executed in parallel and so that after the end of computation, the result of the computation is written directly to the selected address on the SRAM 24, even higher-speed operation will be possible.

Next, subtraction and comparison are described. Subtraction can be realized by a similar operation as addition, if data supplied to the adder 26 by the selector 4 is employed as the inverted output of the register W1. That is, in the case where subtraction is performed, the state machine 29 instructs the selector 3 to select the register W0 and the selector 34 to select the inverted output of the register W1 inverted through the inverter INV and also sets the initial carry input IC) of the adder 26 to 1.

With this, the output of the register W0 and the inverted output −W1 of the register W1 are supplied to the adder 26, which in turn outputs the sum of these, that is, W0−W1. The result of the subtraction can be fetched to arbitrary registers W0 through W4 by controlling the selectors 35 and 30 through 32 and the data retention of each register. When W0≧W1, the carry output (CAR) of the adder 26 becomes 1, and consequently, this computation can also be employed in the comparison in size between the values of W0 and W1.

Figures 18, 19:
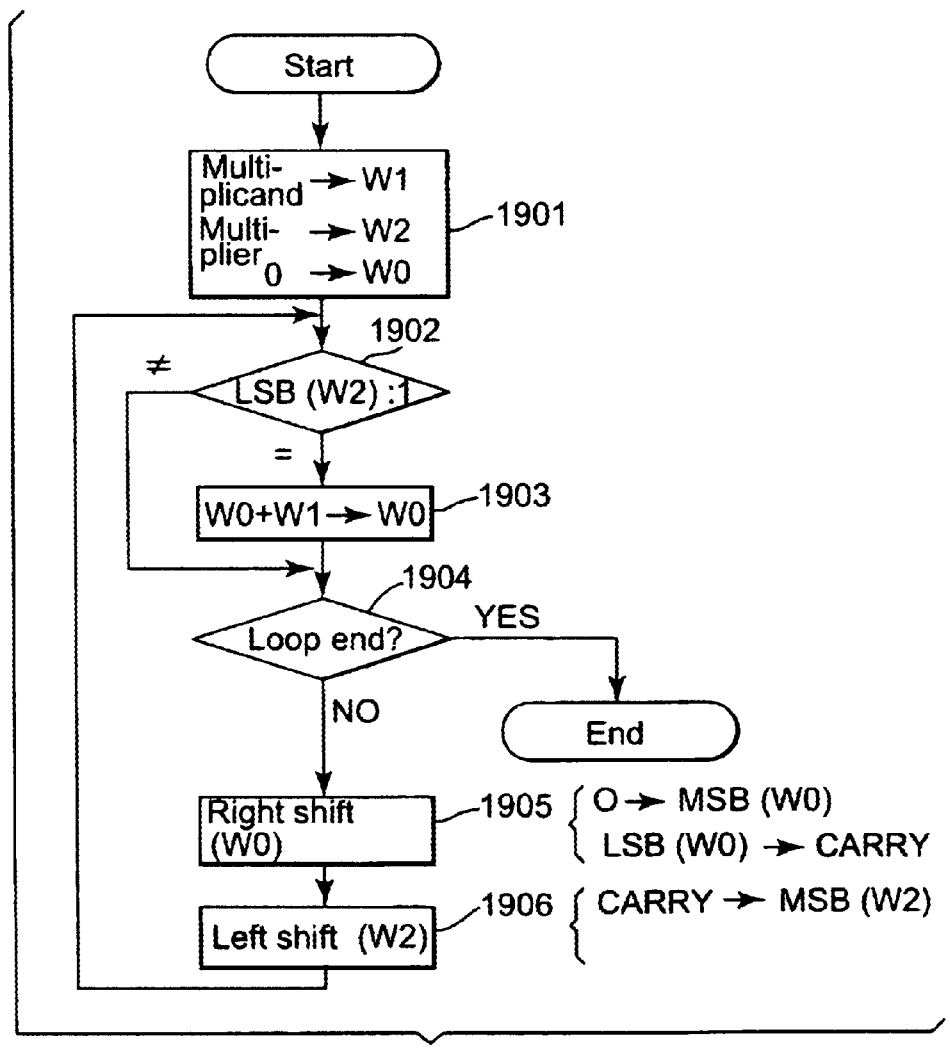
FIG. 18 is a diagram showing binary multiplication performed by manual calculation.
FIG. 19 is a flowchart showing multiplication performed by the SA.

Next is multiplication. Multiplication is performed with similar principles as decimal multiplication that is performed by manual computation, but in the case of binary, multiplication is simple, and as shown in FIG. 18, if a bit corresponding to a multiplier is 1, multiplication can be realized by adding a multiplicand.

While a description will hereinafter be made of the case of 8 bits, even in the case of 16 bits the differing point is only the number of loops but description is consistent with an 8-bit case. In fact the state machine 29 is constituted by a hardware logic, and the operation in the case where multiplication is performed is expressed by a flowchart shown in FIG. 19.

That is, in the case where multiplication is performed, the state machine 29 first advances to step 1901, and controls the selectors 31, 32, and 35 and the registers W1 and W2 so that a multiplicand (for example, 11) is stored in W1 and a multiplier (for example, 5) in W2, as shown in FIG. 20(a). The state machine 29 also controls the selector 30 and the register W0 so that the value of the register W0 becomes 0.

Next, the state machine 29 advances to step 1902 and judges whether or not the least significant bit (LSB) of the value of the register W2 is 1. If it is 1, the state machine 29 will advance to step 1903. If it is not 1, then the state machine 29 will advance to step 1904.

In step 1903 the state machine 29 controls the selectors 33 and 34 and the adder 26 so that the sum of the registers W0 and W1 is computed. The result of the computation is supplied to the register W0 through the registers W3 and W4 or through the SRAM 24 and the selectors 35 and 30 and is stored in the register W0. Next, the state machine 29 advances to step 1904.

In step 1904 the state machine 29 judges whether or not loops corresponding to a predetermined number of bits have been ended. If the loops have been ended, the computation will be ended. If the loops have not been ended, then the state machine 29 will advance to step 1905.

In step 1905 the state machine 29 shifts the value of the register W0 right by one bit. On the most significant bit (MSB) of the register W0 a value of 0 is inserted, and the LSB of the register W0 is retained, for example, by a carry (CARRY) (not shown).

In step 1906 the state machine 29 shifts the value of the register W2 right by one bit and returns to step 1902. On the MSB of the register W2 the value of the carry (CARRY) is inserted.

For the processing in steps 1905 and 1906, even if, for example, in the aforementioned step 1903 the output of the adder 26 were not supplied to the register W0 but were temporarily retained in the registers W3 and W4, then the bits other than the LSB of the value retained in each of the registers W3 and W4 were supplied in step 1905 to the register W0, and even if in step 1906 the LSB were supplied as the MSB to the register W2, a similar operation as the aforementioned could be realized.

The loop of steps 1902 through 1906 is repeated a plurality of times corresponding to the number of bits of a multiplier (for example, 8 bits). As shown in FIGS. 20(b) through (e), each time the loop is executed once, the value of a multiplier is confirmed one bit at a time from the low order bit and, in correspondence with this value, a multiplicand is added in sequence to the register W0. This operation is substantially equivalent to a multiplicand, weighted in correspondence with the digit of a multiplier, being added to the register W0, because in steps 1905 and 1906 the value of the register W0 has been transferred in sequence to the register W2 from the low order bit.

If the loop of steps 1902 through 1906 is repeated a plurality of times corresponding to the number of bits of a multiplier and ends, the result of the multiplication will be retained in the register W2, as shown in FIG. 20(f).

As previously described, the adder 26 takes 50 ns to perform a single computation and 16-bit multiplication needs to execute the aforementioned loop of steps 1902 through 1906 16 times, so the processing time of this multiplication takes 800 ns.

Figures 20, 21:
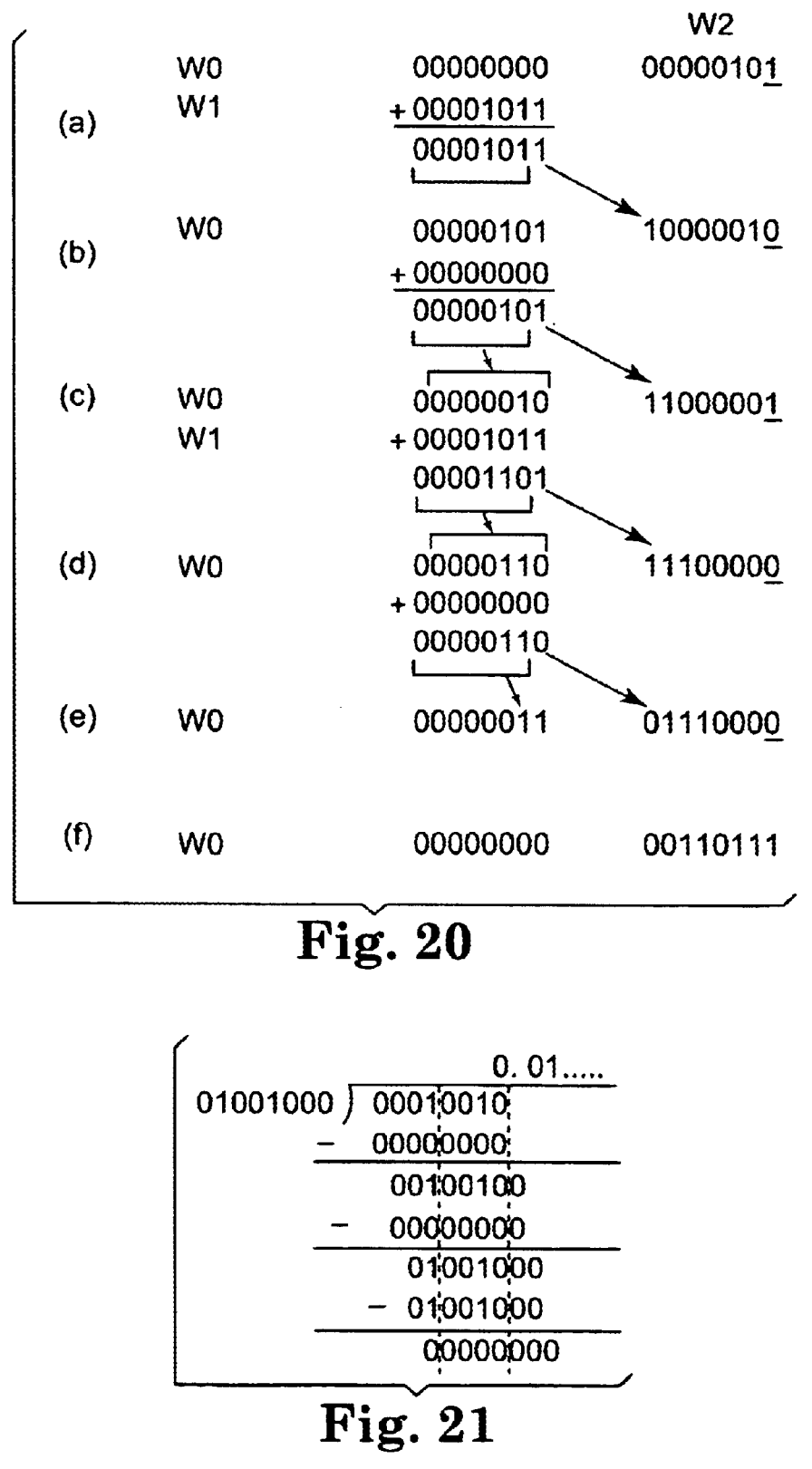

Next is division. Division, as with manual computation, is realized by repetition of subtraction, but as shown in FIG. 21, in the case of binary, division is simple and the first digit to the left of the binary point of a quotient is either 0 or 1. While a description will hereinafter be made of the case of 8 bits, even in the case of 16 bits the differing point is only the number of loops (16 loops) but description is consistent with an 8-bit case.

Figure 22:
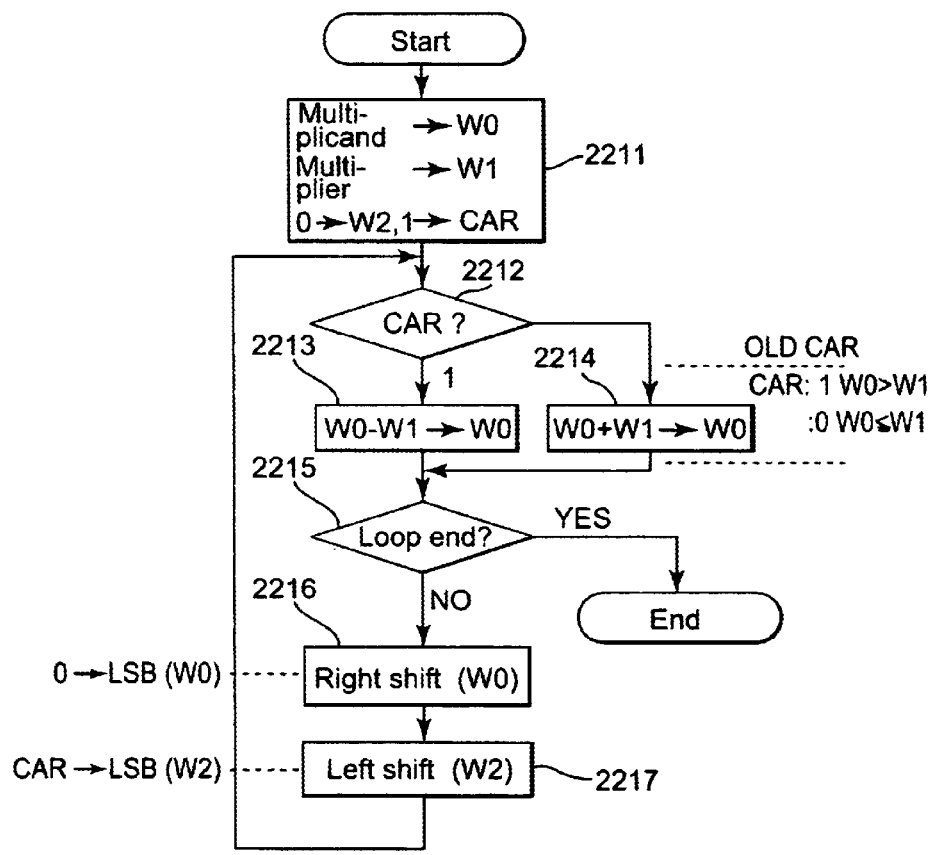
FIG. 22 is a flowchart showing division performed by the SA.
Figure 23:
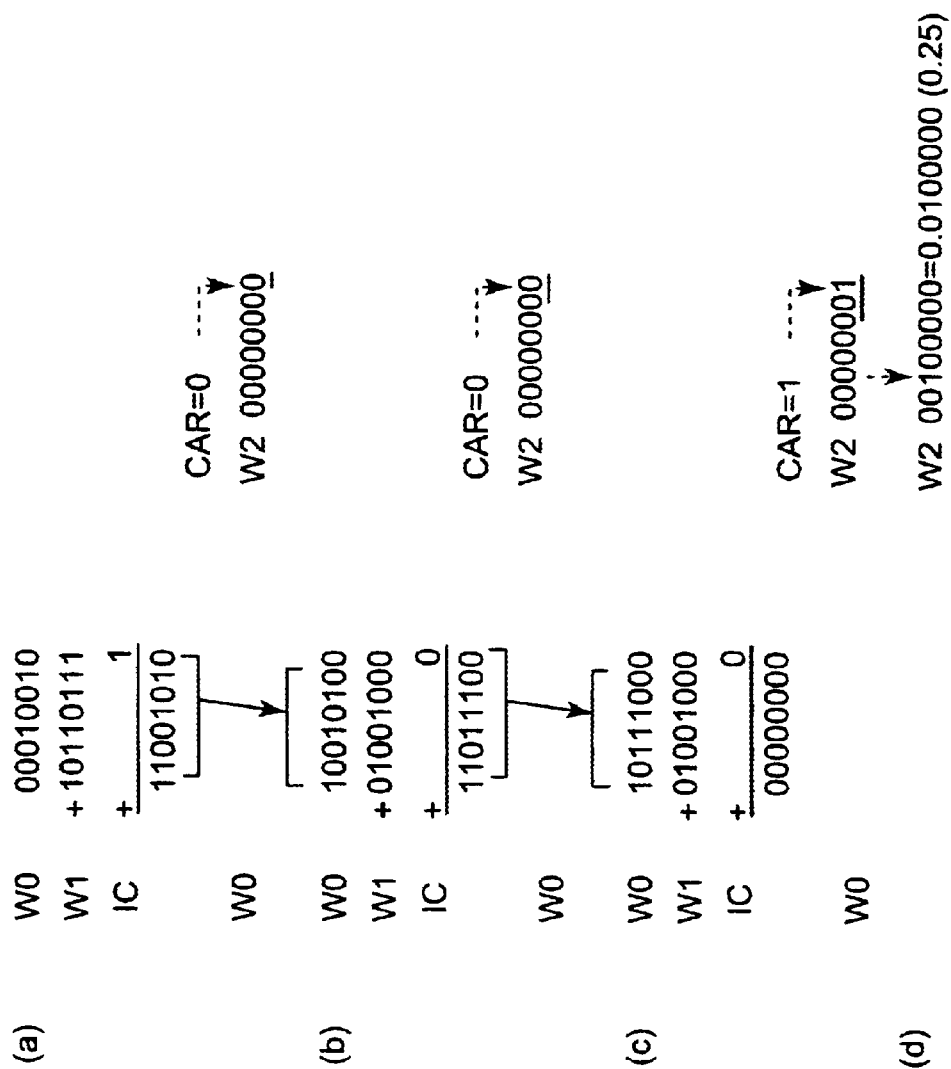
FIG. 23 is a diagram showing data change in the division performed by the SA.

Actually the state machine 29 is constituted by a hardware logic, and the operation in the case where division is performed is expressed by a flowchart shown in FIG. 22. That is, in the case where division is performed, the state machine 29 first advances to step 2201, and controls the selectors 30, 31, and 35 and the registers W0 and W1 so that a dividend (for example, 18) is stored in W0 and a divisor (for example, 72) in W1, as shown in FIG. 23(a). The hardware state machine 29 also controls the selector 32 and the register W2 so that the value of the register W2 becomes 0. The carry output (CAR) of the adder 26 is set to 1.

Next, the state machine 29 advances to step 2202 and judges whether the carry output (CAR) of the adder 26 is 1 or 0. If it is 1, the state machine 29 will advance to step 2203. If it is 0, then the state machine 29 will advance to step 2204.

In step 2203 the state machine 29 instructs the selector 33 to select the output of the register W0 and the selector 34 to select the inverted output of the register W1 and causes the adder 26 to compute the difference between W0 and W1. The result of the computation of the adder 26 is supplied to the register W0 through the registers W3 and W4 or through the SRAM 24 and the selectors 35 and 30. Next, the state machine 29 advances to step 2205.

In step 2203, if a dividend is greater than a divisor, the carry output (CAR) of the adder 26 will be 1 and the quotient of a current digit will be 1, as shown in FIG. 23(c). Conversely, if a dividend is less than a divisor, then the carry output (CAR) of the adder 26 will be 0 and the quotient of a current digit will be 0, as shown in FIGS. 23(a) and (b). In this case, the value of the register W1 may also be added to the register W0 and, in the next loop, subtraction may also be performed on the value of the register W0 shifted left by one bit, but as described later, it will be sufficient if the addition is not performed but correction is performed in the next loop.

On the other hand, in step 2204 the state machine 29 instructs the selector 33 to select the register W0 and the selector 34 to select the register W1 and causes the adder 26 to compute the sum of W0 and W1. The result of the computation is supplied to the register W0 through the registers W3 and W4 or through the SRAM 24 and the selectors 35 and 30. Next, the state machine 29 advances to step 2205.

In step 2205 the state machine 29 judges whether or not loops corresponding to a predetermined number of bits have been ended. If the loops have been ended, the computation will be ended. If the loops have not been ended, then the state machine 29 will advance to the following step 2206.

In step 2206 the state machine 29 shifts the value of the register W0 left by one bit. On the LSB of the register W0 a value of 0 is inserted.

For the processing in step 2206, even if, for example, in the aforementioned step 2203 and step 2204 the output of the adder 26 were not supplied to the register W0 but were temporarily retained in the registers W3 and W4 and also the bits other than the MSB of the value retained in each of the registers W3 and W4 were supplied in step 2206 to the register W0, a similar operation could be realized.

In step 2207 the state machine 29 shifts the value of the register W2 left by one bit. With this, on the LSB of the register W2 the value of the carry output (CAR) of the adder 26 is inserted. Thereafter, the state machine 29 returns to step 2202.

In the case where a quotient is computed in exactly the same way as manual computation shown in FIG. 21, when in step S13 the difference between the values of the registers W0 and W1 is computed and the value of the register W0 is smaller, there is a need to add the value of the register W1 to the value of the register W0 and in the next loop to compare the doubled value of the register W0 (shifted left by one bit) with the value of the register W1.

However, from the following equation it is found that the addition of the value of the register W1 to the register W0 and the subtraction of the value of the register W1 from the value of the register W0 doubled in the next loop are equal to the register W1 being added to the value of the register W0 doubled without performing addition in the next loop.

$$(W0+W1) \times 2 - W1 = W0 \times 2 + W1 \qquad (5)$$

Hence, in the processing shown in FIG. 22, in step S12 it is judged whether or not correction is required, based on the carry output (CAR) of the adder 26 in the preceding subtraction. If no correction is required (that is, when CAR=1), step 2203 will be executed and if correction is required (that is, when CAR=0), step 2204 will be executed, thereby performing the correction of the right side of Equation (5). The method of computing a quotient by performing such correction is referred to as a nonrestoring method.

The loop of steps 2202 through 2207 is repeated a plurality of times corresponding to the number of bits of a quotient (for example, 8 bits). As shown in FIGS. 23(a) through (c), each time the loop is executed once, it is confirmed whether the value of the register W0 is greater than a divisor (the value of the register W1) (step 2203 or 2204). Also, the quotient of each digit is computed as the carry output (CAR) of the adder 26, and this quotient is supplied in sequence to the LSB of the register W2 (step 2207). The value of the register W0 is shifted left by one bit at a time and then the next loop is executed. The value of the register W0 is shifted left by one bit in each loop to double the value, then a divisor (the value of the register W1) is subtracted from the value W0, and the quotient of each digit is computed by comparing the values of W0 and W1 with each other. This method for computing the quotient of each digit is equivalent to a method where the quotient of each digit is computed by multiplying a divisor by ½ and subtracting the result from the divisor, in sequence.

If the loop of steps 2202 through 2207 is repeated a plurality of times corresponding to the number of bits of a quotient and ends, the quotient will be retained in the register W2, as shown in FIG. 23(d).

As previously described, the adder 26 takes 50 ns to perform a single computation and 16-bit division needs to execute the aforementioned loop of steps 2202 through 2207 16 times, so the processing time of this division takes 800 ns. In the division which is used for the aforementioned generation of PES, such as (A−B)/(A+B) (00h# A, B# FFh), the denominator is greater than the numerator, and the quotient which is computed is less than 1. Therefore, if the bit positions of a dividend and a divisor are made even and then subtraction is started, the first quotient will represent the position of 2⁰, which has a weight of 1, and the second quotient will represent the position of 2−1, which has a weight of 0.5.

In the aforementioned processing shown in FIG. 22, a reminder has not been computed. However, if, in division, one additional loop is computed to obtain a rounding bit and, in the next multiplication, one additional computation is performed, the digit drop of the PES value finally obtained can be prevented. The disk drive of this embodiment, incidentally, also executes the input-output control of commands and data between it and an external unit and the control of reading or writing data from or to the magnetic disk 1, in addition to the aforementioned servo control.

Hitherto, the input-output control of commands and data and the write/read control have been executed between servo controls (during empty time), because the priority of servo control is high. In addition, particularly in high-performance disk drives, it is important to perform these controls at high speed and, therefore, there are cases where an MPU or a DSP for executing servo control is provided in addition to the MPU which perform the aforementioned controls. However, since the MPU or the DSP includes functions not needed for servo control, the device fabrication cost has been raised to more than necessary.

In recent years, disk drives have been required to have high performance and low cost. Also, disk drives have been required to execute servo control, input-output control of commands and data, and read/write control at high speed by a single processor.

In the disk drive of this embodiment, as previously described, the SA 23 (computation means) which performs the computation of servo data (such as a position error signal PES) is provided separately from the MPU (control means) which has hitherto performed the input-output control of commands and data in addition to the computation of servo data (such as a PES), whereby processing load to the MPU can be lightened without increasing cost so much compared with the case where an exclusive DSP or MPU for these computations is provided.

Furthermore, various corrections, such as the aforementioned filter processing and oversampling processing of servo data (CNTIN), which were difficult to process by an MPU, can be easily realized. A description will hereinafter be made of the filter processing and the oversampling processing.

With regard to filter processing, the head drive system, such as the head arm 3 in FIG. 1, has a natural oscillation frequency in correspondence with its structure. For this reason, when the servo data (CNTIN) computed by the aforementioned Equation (5), as it is, is supplied to the VCM driver section 6 as control data DACOUT, there are cases where the head drive system will resonate by the natural oscillation frequency component contained in the control data DACOUT. Therefore, it is preferable to set a frequency limit on servo data. In background art, the processing for the frequency limit is realized by a filter circuit, or a DSP or an MPU is provided separately from the MPU 12 which executes the input-output control of data between it and external equipment, and consequently, the cost of the entire disk drive has been increased.

Filter processing such as this can be performed by multiplying servo data (CNTIN) or a preceding filter output (CNTOUT) by appropriate coefficients Ai and Bi and adding them. More specifically, the filter output (CNTOUT) is obtained by the following equation.

$$U = A0 \times CNTIN + A1 \times U11 + A2 \times U12$$

$$CNTOUT = U + B1 \times U11 + B2 \times U12$$

$$U12 = U11$$

$$U11 = U$$

In the disk drive of this embodiment, such computation processing can be executed by the SA 23. Furthermore, on the filter output the aforementioned gain adjustment and limit processing are performed, and the processed filter output is supplied to the SIO 22 as control data DACOUT for controlling the VCM driver section 6. Note that the filter processing may also be executed a plurality of times by changing coefficients and may be multi-stage connection filter processing. Also, as occasion demands, the aforementioned round processing (an additional loop of multiplication is executed once to obtain a rounding bit) may be performed.

Thus, by performing filter processing and setting a frequency limit on control data DACOUT, the resonance of a head drive system, such as head arm 3, can be prevented. Even in this case, filter processing can be performed independent of the MPU 12 by the SA 23, so there is almost no increase in the addition of processing to the MPU 12.

With regard to oversampling processing, generally, the supply of control data DACOUT to the VCM driver section 6 is often performed once per regeneration of a single servo pattern. However, the cycle of servo patterns is anywhere between about 5 KHz and 10 KHz, and if servo patterns are left as they are, the sound which is generated by the vibration of the head arm 3 will be within a human audio frequency band and will be recognized as noise.

By performing oversampling processing which separately outputs the control data (DACOUT) of each servo pattern a plurality of times, the sound which is generated by the vibration of the head arm 3 can be moved outside a human audio frequency band.

Figure 24:
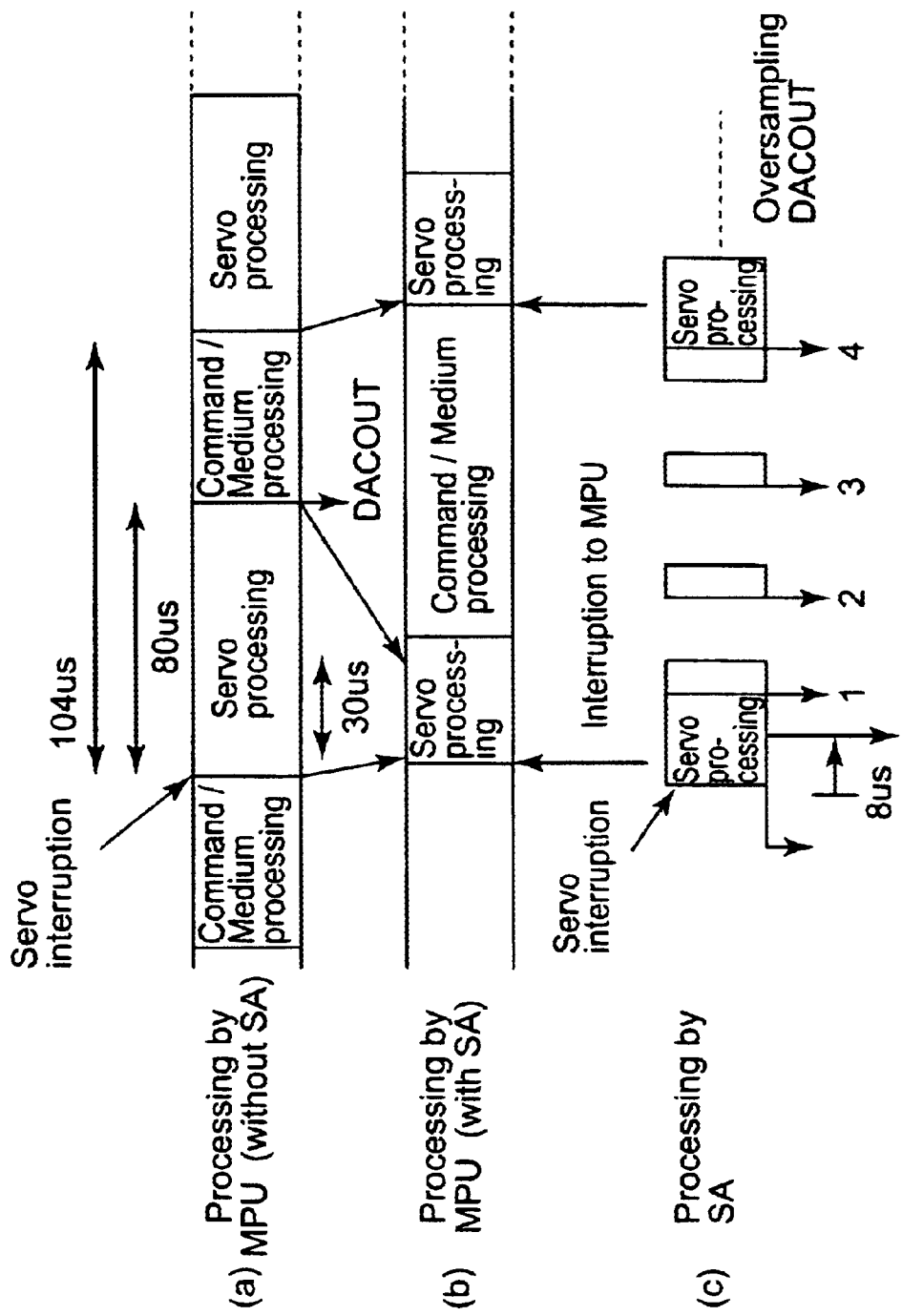
FIG. 24 is a diagram showing oversampling processing performed by the SA.

In the disk drive of this embodiment, control data DACOUT is output four times, for example, at servo-pattern intervals by the SA 23. The SA 23 executes only once the aforementioned processing until servo data CNTIN is computed, for each servo pattern. Next, filter processing is executed and the first control data DACOUT is output. Thereafter, filter processing for the second control data DACOUT is immediately performed. The SA 23 waits for a DACOUT request which is sent by a timer measuring a DACOUT interval. If the timer sends a DACOUT request, the SA 23 will output the control data DACOUT which has been obtained and will repeat similar processing a prescribed member of times. With this operation, as shown in FIG. 24(c), control data DACOUT can be output at intervals of ¼ of the servo pattern interval.

Thus, if the output of control data DACOUT is performed 4 times for each regeneration interval of a servo pattern (that is, quadruple oversampling), the first processing which takes the most time will need to end in about 25 $\mu$s of ¼ of the regeneration interval of a servo pattern. Therefore, there is a need to construct the SA 23 so that it exhibits computation performance of this degree.

In the case where 80 servo patterns are present along the circumference of a data storage medium (magnetic disk 1) and the rotational speed of the data storage medium is 7200 rpm, a servo sector is regenerated at intervals of about 104 $\mu$s. Therefore, the SA 23 has to compute servo data within this time and output control data DACOUT.

In the case where the aforementioned processing for servo control is performed only by an MPU, the MPU is occupied during the period more than 80 $\mu$s from the occurrence of servo interruption caused by generation of a servo sector to the end of the first processing for servo LO control (the first servo processing). For this reason, the processing time of the MPU which executes the processing (command/medium processing) for input-output control of data between it and external equipment and write/read control of data to a data storage medium (magnetic disk 1) is only about 20% of the entire processing time.

On the other hand, in the disk drive of this embodiment, computation for servo control can be executed independent of the MPU 12 by the SA 23. Therefore, when servo interruption occurs as shown in FIGS. 24(b) and (c), the SA 23 first computes parameters, such as the aforementioned deviation CPE and speed CVE. The SA 23 sends an interruption request to the MPU 12 when processing by the MPU 12, such as processing whose contents cannot be previously prescribed in hardware specification and error processing, is needed. Therefore, the processing by the MPU 12 usually ends in a short time and the MPU 12 is released from processing. After the output of the first control data DACOUT, the SA 23 outputs control data DACOUT for every a predetermined time. For this reason, the servo processing which is executed by the MPU 12 can be set to about 30 $\mu$s for every 104 $\mu$s (regeneration interval of a servo pattern). For this reason, the processing time of the MPU 12 for executing command/medium processing can be increased. Although command/medium processing load has been increased due to the high performance of data processors, the disk drive of this embodiment can easily cope with an increase in the processing load by increasing the command/medium processing time in the aforementioned way.

Figure 25:
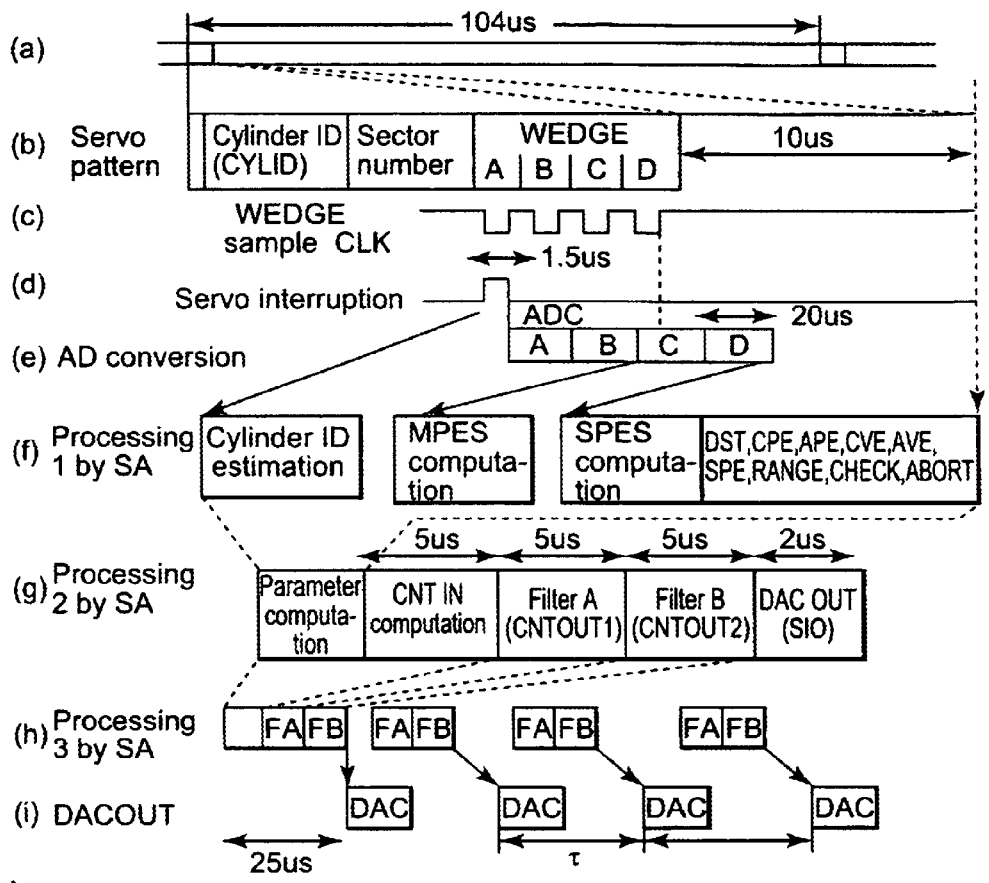
FIG. 25 is a diagram conceptually showing the entire computation processing performed by the SA.

FIG. 25 conceptually shows the generation of servo sectors and the timing of the aforementioned processing. Note that FIG. 25 shows the processing which executes two kinds of filter processing (filter A and filter B) and also performs quadruple oversampling processing.

If the regenerations of the cylinder ID number and the sector number shown in FIG. 25(b) are ended and also regeneration of burst patterns (WEDGE-A, WEDGE-B, WEDGE-C, WEDGE-D) is started, a WEDGE sample clock (CLK) signal will be generated as shown in FIG. 25(c) and a servo interruption signal will be generated as shown in FIG. 25(d). As shown in FIG. 25(e), since there is time between the time that interruption occurs and the time that the AD conversions of the regenerated levels A, B, C, and D of the servo patterns by the ADC 16 are ended and retained in the ADC register (ADCREG) 17, the SA 23 first executes the aforementioned cylinder ID estimation processing, as shown in FIG. 25(f).

After the AD conversion of pattern WEDGE-B by the ADC 16 has been ended, the SA 23 starts computation of a master position error signal MPES. The reason why the computation processing of the position error signal PES (MPES) is started when an AD conversion is being performed is for executing the aforementioned abort processing as early as possible and is that the start of the computation of MPES is possible at the stage where the AD conversion of pattern WEDGE-B has been ended. Successively, after the AD conversion of pattern WEDGE-D has been ended, the SA 23 starts computation of a slave position error signal SPES. After the computation of the SPES, the SA 23 computes parameters, such as the aforementioned parameters DST, CPE, APE, CVE, AVE, and SPE, and furthermore, executes the aforementioned range judgment of deviation and speed, the deviation prediction, and the write abort processing.

If the computation of the aforementioned parameters has been ended, the SA 23 will compute servo data CNTIN and furthermore execute filter processing of two stages (filter A and filter B), as shown in FIG. 25(g). After the end of the filter processing, the SA 23 outputs the first servo data to the VCM driver section 6 through the SIO 22 as control data DACOUT.

Thereafter, as shown in FIGS. 25(h) and (i), the SA 23 executes filter processing again for every a predetermined time, based on the first servo data CNTIN, and likewise outputs computed servo data to the VCM driver section 6 as control data DACOUT.

Although the output interval of DACOUT can be accurately controlled because processing has been performed based on the output of a timer by hardware, it is possible that there will be a fluctuation of about 2 μs due to the conflict control between the SIO 22, the SA 23 and the MPU 12, because the SIO 22 is shared by the SA 23 and the MPU 12, as described above.

Incidentally, from the viewpoint of a reduction in the sound, which is generated by the vibration of the head arm 3, and mechanical characteristics, conversely it is advantageous to have a certain degree of fluctuation in the output interval of control data DACOUT. For example, in human audio characteristics, between a sound with a sharp frequency distribution and a sound with a gently-sloping frequency the sound with a sharp frequency distribution is felt louder. For this reason, if the output interval of control data DACOUT is given fluctuation, the strength of a sound which is recognized as noise can be reduced. In addition, giving fluctuation to the output interval of control data DACOUT can contribute to an enhancement in durability and an enhancement in mechanical characteristics such as a reduction in vibration.

Figure 26:
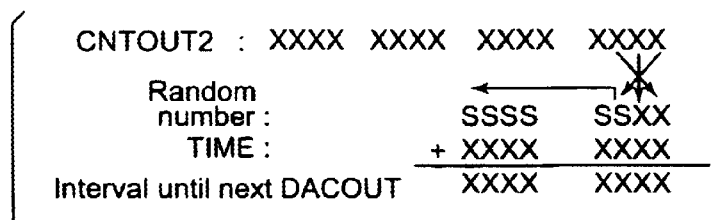
FIG. 26 is a diagram showing a method of computing a DACOUT interval.

More specifically, as shown in FIG. 26, the SA 23 generates a random number from the output (CNTOUT2) of filter processing B and adds it to the initial set value (TIMER) of the timer each time control data DACOUT is output, thereby computing the interval between the current control data DACOUT and the next control data DACOUT. The random number is generated by computing an absolute value and a sign from the low order 3 bits of the output CNTOUT2 and has a value area of −4 to +3. If a random number such as this is added to the initial timer set value (for example, 25) to compute the DACOUT interval, the average value of the DACOUT intervals (21 to 28 :s) will be nearly equal to the initial timer set value.

For most computations for servo control such as described above, the SA 23 can independently execute them if necessary coefficients and parameters are previously set to ADC register 17, registers W0 through W4, and SRAM 24. In the situation which cannot be processed with the SA 23 alone, such as error processing and exception processing, the SA 23 sends an interrupt request to the MPU 12, as described above, and the processing thereafter is executed by the MPU 12.

In order to perform all of servo processing until the first control data DACOUT is computed, there is a need to use an adder more than 30 times. The time it takes an adder to execute one loop of the aforementioned computation is 50 ns and the time to access SRAM 24 is 75 ns. Therefore, for example, in the case where access to the SRAM 24 occurs twice for every 16 loops, the required time is 300×50+75×300/8=about 17.8 μs and therefore it is possible to set the required time within the target time 25 μs from the beginning till the aforementioned first control data DACOUT.

In the aforementioned embodiments, while a description has been made mainly of a following operation which causes a head to follow a target track, the present invention is also applicable to a seek operation which moves a head to a target track and other servo controls.

In addition, in the aforementioned embodiments, although the SA 23 has been equipped with an adder, various arithmetic units for performing multiplication and division at high speed (for example, parallel multiplier which computes the partial products of multiplication in parallel and adds them) have been developed and therefore the computation performance of multiplication and division can be further enhanced by employing the arithmetic units. With this structure, an increase in the multiple of oversampling and an increase in the number of stages of filtering can be easily achieved. Furthermore, the present invention may be modified within the scope of the invention where a portion of the computation for servo control is realized by hardware which operates independently of an MPU.

In summary, in the drive disk according to the present invention, arithmetic means provided separately from control means computes servo data for driving a drive unit, based on the position information extracted by position information extraction means. Therefore, the processing load to the control means can be reduced. For this reason, high-degree servo control can be realized without increasing processing load to the control means so much. While the preferred embodiments of the present invention have been illustrated in detail, it should be apparent that modifications and adaptations to those embodiments may occur to one skilled in the art without departing from the scope of the present invention as set forth in the following claims.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive comprising:
a disk storage medium having a servo area on which servo sectors are recorded and a data area on which data sectors are recorded;
a record/regenerate section for performing regeneration of a servo sector recorded on said disk storage medium and also performing recording or regeneration of data sector;
a drive section for controlling a position of said record/regenerate section;
a control section for performing, at a position based on computed servo data, at least input-output control of data with respect to external equipment and control of the recording and regeneration of a data sector which is performed by said record/regenerate section;
a position information extraction section provided separately from said control section for extracting position information indicating the position of said record/regenerate section from a regenerated output of the servo sector regenerated by said record/regenerate section;

an arithmetic section provided separately from said control section, the arithmetic section computing servo data for driving said drive section based on the position information extracted by said position information extraction section, wherein said servo data computations are performed without said control section interaction; and an I/O controller, coupled to the drive section, for providing control conflict between the position information extraction section and the control section, wherein the position information extraction section and the arithmetic section offload servo control processing from the control section.

2. The disk drive as set forth in claim 1, wherein said arithmetic section comprises:

a plurality of retaining sections for retaining data generated in the interior of said position information extraction section, said control section, or said arithmetic section;

an adder;

at least two selectors for selecting data which is supplied to said adder from data retained in said plurality of retaining sections, external input, and from data generated in the interior of said arithmetic section; and a hardware sequencer for controlling operations of said retaining sections, said adder, and said selectors so that said servo data is computed.

3. The disk drive as set forth in claim 1, wherein said arithmetic section outputs the result of computation a plurality of times while said servo sector is regenerated.

4. The disk drive as set forth in claim 3, wherein said arithmetic section outputs the computation results of said plurality of times at irregular intervals.

5. The disk drive as set forth in claim 1, wherein said arithmetic section sets a band limit on a time series of computation results which are output for each of said servo sectors.

6. The disk drive as set forth in claim 1, wherein at least said control section and said arithmetic section are formed on the same semiconductor device.

7. A disk drive comprising:

a disk storage medium having a servo area on which servo sectors are recorded and a data area on which data sectors are recorded;

a record/regenerate section for performing regeneration of a servo sector recorded on said disk storage medium and also performing recording or regeneration of a data sector;

a control section for performing, at a position based on computed servo data, at least input-output control of data with respect to external equipment and control of the recording and regeneration of a data sector which is performed by said record/regenerate section;

a drive section for moving said record/regenerate section;

a servo control unit for controlling a position of a record/regenerate section in a disk drive, said servo control unit comprising:

a position information extraction section provided separately from said control section for extracting position information indicating the position of said record/regenerate section from a regenerated output of the servo sector regenerated by said record/regenerate section; and an arithmetic section provided separately from said control section, the arithmetic section computing servo data for driving said drive section base on the position information extracted by said position information extraction section, wherein said servo data computations are without said control section interaction; and an I/O controller, coupled to the drive section, for providing control conflict between the position information extraction section and the control section, wherein position information extraction section and the arithmetic section offload servo control processing from the control section.

8. A disk drive comprising:

a disk storage medium having a servo area on which servo sectors are recorded and a data area on which data sectors are recorded;

a record/regenerate section for performing regeneration of a servo sector recorded on said disk storage medium and also performing recording or regeneration of data; and a drive section for controlling a position of said record/regenerate section; and a control unit for controlling a disk drive, said control unit comprising:

a position information extraction section for extracting position information indicating the position of said record/regenerate section from a regenerated output of the servo sector regenerated by said record/regenerate section;

a control section provided separately from said position information extraction section for performing, at a position based on computed servo data, at least input-output control of data with respect to external equipment and control of the recording and regeneration of a data sector which is performed by said record/regenerate section; and an arithmetic section provided separately from said control section, the arithmetic section computing servo data for driving said drive section based on the position information extracted by said position information extraction section, wherein servo data computations are without said control section interaction; and an I/O controller, coupled to the drive section, for providing control conflict between the position information extraction section and the control section, wherein the position information extraction section and the arithmetic section offload servo control processing from the control section.

9. The control unit as set forth in claim 8, wherein at least said control section and said arithmetic section are formed on the same semiconductor device.

* * * * *

UNITED STATES PATENT AND TRADEMARK OFFICE
CERTIFICATE OF CORRECTION

PATENT NO. : 6,678,109 B2
DATED : January 13, 2004
INVENTOR(S) : Kagami et al.

It is certified that error appears in the above-identified patent and that said Letters Patent is hereby corrected as shown below:

Title page,
Item [75], Inventors, should read as follows:
-- Naoyuki Kagami, Fujisawa-Shi (JP);
   Masayuki Murakami, Fujisawa-Shi (JP);
   Yuzo Nakagawa Hiratsuka-Shi (JP);
   Tatsuya Sakai, Yamato-Shi (JP) --
Item [73], Assignee, should read as follows:
-- Hitachi Global Storage Technologies Netherlands B.V. --

Column 2,
Line 22, "00h≦A, B, C, and D≦FFh" should read -- $00h \leq A, B, C,$ and $D \leq FFh$ --.
Line 23, "00h≦H≦7Fh," should read -- $00h \leq H \leq 7Fh$, --.

Column 6,
Line 64, "00h≦A, B, C, and D≦FFh" should read -- $00h \leq A, B, C,$ and $D \leq FFh$ --.
Line 65, "00h≦H≦7Fh," should read -- $00h \leq H \leq 7Fh$, --.

Column 7,
Line 13, "00h≦HS≦7Fh," should read -- $00h \leq HS \leq 7Fh$, --.

Column 12,
Line 22, "output f" should read -- output of --.
Line 26, "registe" should read -- register --.
Line 59, "selector 3" should read -- selector 33 --.
Line 61, "IC)" should read -- (IC) --.

Column 13,
Line 2, "W0≦W1," should read -- $W0 \leq W1$ --.

Column 18,
Line 8, delete "LO".

UNITED STATES PATENT AND TRADEMARK OFFICE
CERTIFICATE OF CORRECTION

PATENT NO. : 6,678,109 B2
DATED : January 13, 2004
INVENTOR(S) : Kagami et al.

It is certified that error appears in the above-identified patent and that said Letters Patent is hereby corrected as shown below:

Column 22,
Line 22, "base should read -- based --.

Signed and Sealed this

Twenty-ninth Day of June, 2004

JON W. DUDAS
*Acting Director of the United States Patent and Trademark Office*